(12) United States Patent
Hebron et al.

(10) Patent No.: US 6,449,927 B2
(45) Date of Patent: *Sep. 17, 2002

(54) INTEGRATED AUTOMATED DRUG DISPENSER METHOD AND APPARATUS

(75) Inventors: Terrance J. Hebron, Antioch, IL (US); Douglas L. Vandy Bogurt, Grand Haven, MI (US)

(73) Assignee: AutoMed Technologies, Inc., Vernon Hills, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/860,204

(22) Filed: May 18, 2001

Related U.S. Application Data

(63) Continuation of application No. 09/209,995, filed on Dec. 11, 1998, now Pat. No. 6,256,967.
(60) Provisional application No. 60/098,124, filed on Aug. 27, 1998.

(51) Int. Cl.[7] .............................. B65B 1/30; B65B 3/26; B65B 57/20
(52) U.S. Cl. ............................... 53/501; 53/55; 53/168; 53/437; 53/131.3
(58) Field of Search .......................... 53/500–501, 168, 53/495, 55, 77, 131.2, 131.3, 411, 437; 220/890; 221/1, 2, 9, 10, 12–13, 92, 96, 129–131, 200, 203, 206, 207; 364/479.05, 479.07, 479.11, 479.12, 479.14, 479.1; 414/740, 739, 783; 901/31, 36

(56) References Cited

U.S. PATENT DOCUMENTS

| | | |
|---|---|---|
| 3,556,342 A | 1/1971 | Guarr |
| 3,584,226 A * | 6/1971 | Lerner ........................ 350/173 |
| 3,722,740 A | 3/1973 | List |
| 3,746,211 A * | 7/1973 | Burgess, Jr. ................... 221/7 |
| 3,871,156 A | 3/1975 | Koening et al. |
| 3,878,967 A | 4/1975 | Joslin et al. |
| 3,885,702 A | 5/1975 | Joslin |
| 3,915,292 A * | 10/1975 | Brown ........................ 221/200 |
| 3,917,045 A | 11/1975 | Williams et al. |
| 3,998,356 A | 12/1976 | Christensen |

(List continued on next page.)

OTHER PUBLICATIONS

Dispensers With Retrieving Devices ScriptPro Pharmacy Automation "Automated Prescription Dispensing System," Dec. 1995 copyright notice indicates date of 1996. (4 pages).
Baker APS brochure, "The Backer AutoScript II System" Date: Before Aug. 1997. (8 pages).
Baker APS brochure, "AutoScript III from Baker APS" Date: Dec. 1997. (2 pages).

(List continued on next page.)

*Primary Examiner*—John Sipos
*Assistant Examiner*—Hemant M Desai
(74) *Attorney, Agent, or Firm*—Jansson, Shupe & Munger, Ltd.

(57) ABSTRACT

A system is provided for automatically dispensing prescriptions according to a patient's order. The system includes at least one line of machines that can automatically fill a patient's prescription order with countable oral solid medication under the control of an appropriate control system. The system includes containers provided to store the oral solid medication. One or more medication-containing containers are detachably coupled to a vibratory dispenser according to a patient's order. The vibratory dispenser automatically vibrates the container to dispense a predetermined amount of medication from the container into the vial according to the patient's order. Labeling and capping apparatus may be provided to apply a patient-specific label to the vial and to apply a cap or closure to the vial. Vials containing medication according to the patient's order may be collected in accumulation receptacles prior to delivery to a patient.

19 Claims, 23 Drawing Sheets

U.S. PATENT DOCUMENTS

| | | | |
|---|---|---|---|
| 4,150,766 A | | 4/1979 | Westendorf et al. |
| 4,350,243 A | * | 9/1982 | Weyandt ..................... 198/769 |
| 4,360,125 A | | 11/1982 | Martindale et al. |
| 4,362,455 A | | 12/1982 | Hirose |
| 4,382,527 A | * | 5/1983 | Lerner ......................... 222/56 |
| 4,546,901 A | | 10/1985 | Buttarazzi |
| 4,664,289 A | | 5/1987 | Shimizu et al. |
| 4,733,362 A | | 3/1988 | Haraguchi |
| 4,804,093 A | | 2/1989 | Durow |
| 4,847,764 A | | 7/1989 | Halverson |
| 4,870,799 A | | 10/1989 | Bergerioux et al. |
| 4,903,861 A | | 2/1990 | Yuyama |
| 5,014,875 A | | 5/1991 | McLaughlin et al. |
| 5,097,652 A | | 3/1992 | Inamura et al. |
| 5,108,005 A | | 4/1992 | Mosbacher |
| 5,208,762 A | | 5/1993 | Charhut et al. |
| 5,219,095 A | | 6/1993 | Shimuzer et al. |
| 5,253,783 A | | 10/1993 | Fruedelsperger |
| 5,292,029 A | | 3/1994 | Pearson |
| 5,317,645 A | | 5/1994 | Perozek et al. |
| 5,335,816 A | | 8/1994 | Kaufman et al. |
| 5,337,919 A | | 8/1994 | Spaulding et al. |
| 5,341,854 A | | 8/1994 | Zezulka et al. |
| 5,348,061 A | | 9/1994 | Riley et al. |
| 5,377,864 A | | 1/1995 | Blechl et al. |
| 5,429,160 A | | 7/1995 | Bardroff et al. |
| 5,431,299 A | | 7/1995 | Brewer et al. |
| 5,473,703 A | | 12/1995 | Smith |
| 5,481,855 A | | 1/1996 | Yuyama |
| 5,502,944 A | | 4/1996 | Kroft et al. |
| 5,533,606 A | | 7/1996 | Yuyama |
| 5,593,267 A | | 1/1997 | McDonald et al. |
| 5,597,995 A | | 1/1997 | Williams et al. |
| 5,604,692 A | | 2/1997 | Yuyama |
| 5,648,751 A | | 7/1997 | Yuyama et al. |
| 5,660,305 A | | 8/1997 | Lasher et al. |
| 5,667,096 A | | 9/1997 | Wu |
| 5,671,592 A | | 9/1997 | Yuyama et al. |
| 5,678,393 A | | 10/1997 | Yuyama et al. |
| 5,709,063 A | | 1/1998 | Yuyama et al. |
| 5,713,485 A | | 2/1998 | Liff et al. |
| 5,713,487 A | | 2/1998 | Coughlin |
| 5,720,154 A | | 2/1998 | Lasher et al. |
| RE35,743 E | | 3/1998 | Pearson |
| 5,752,368 A | | 5/1998 | Tobe |
| 5,758,095 A | | 5/1998 | Albaum et al. |
| 5,761,877 A | | 6/1998 | Quandt |
| 5,762,235 A | | 6/1998 | Coughlin |
| 5,765,606 A | | 6/1998 | Takemasa et al. |
| 5,771,657 A | | 6/1998 | Lasher et al. |
| 5,790,409 A | | 8/1998 | Fedor et al. |
| 5,797,515 A | | 8/1998 | Liff et al. |
| 5,798,020 A | | 8/1998 | Coughlin et al. |
| 5,803,309 A | | 9/1998 | Yuyama et al. |
| 5,819,500 A | | 10/1998 | Haraguchi et al. |
| 5,839,836 A | | 11/1998 | Yuyama et al. |
| 5,852,911 A | | 12/1998 | Yuyama et al. |
| 5,852,971 A | | 12/1998 | Yuyama et al. |
| 5,895,189 A | * | 4/1999 | Ruckert ..................... 411/535 |

FOREIGN PATENT DOCUMENTS

| | | |
|---|---|---|
| JP | 08-145495 | 2/1997 |

OTHER PUBLICATIONS

Baker APS brochure, "Pharmacy 2000 The Pharmacy of the Future . . . Today!" Date: Before Aug. 1997. (4 pages).

Automated Healthcare, Inc. brochure, "Rx ROBOT" Date: Before Aug. 1997. (8 pages).

Baker APS brochure, "Speed, Accuracy, and Productivity" Date: Dec. 1997. (4 pages).

Vial–Filling Dispensers Innovation Associates, "PharmASSIST" Date: Not later than Dec. 3, 1997, probably Aug. 1997. (6 pages).

Innovation Associates, "PharmASSIST" brochure "Order Entry Manual Filling . . . " Date: After Aug. 1997, probably 1998. (11 pages).

Baker APS brochure, "Pharmacy 1000" Date: Not later than Dec. 3, 1997, probably Jun. 1997. (2 pages).

Baker APS brochure, "The New Generation Baker Cassette . . . " Undated. (2 pages).

Baker APS brochure, "Unleash the Power" Date: Before Aug. 1997. (4 pages).

Background Information Medical Packaging Inc., "AutoPakTM—A Fully Automated Unit Dose Packaging System" Date: Not later than Dec. 3, 1997, probably 1996. (2 pages).

Baker APS, "Expand Your Pharmacy's Potential with the Total Automation Starter Kit from Baker APS" Date: Not later than Dec. 3, 1997, probably 1995. (2 pages).

Tosho, "Tosho Main–Topra Series PC–Cat" Date: Not later than Dec. 3, 1997, probably 1993. (14 pages).

Sanyo, "AIR–RNC7/RNV7" Date: Not later than Dec. 3, 1997, probably early 1990s. (4 pages).

Excerpts from Yuyama Mfg. Co., Ltd., "Yuyama Pharmaceutical Equipment General Catalog" Datee: Uncertain, possibly 1997 (see second page). (10 pages).

Excerpts from Yuyama Mfg. Co., Ltd., Yuyama catalog Date: Not later than Dec. 3, 1997, probably 1995 or earlier (see third and eighth pages). (9 pages).

Vibratory Dispensers Excerpts from Arthur G. Russell Co., Inc. catalog, "VibroBlock Feeder Systems" Date: Arthur G. Russell Co., Inc. advises that the date is 1993. (5 pages).

* cited by examiner

INTEGRATED AUTOMATED DRUG DISPENSER METHOD AND APPARATUS

RELATED APPLICATIONS

This application is a continuation of U.S. patent application Ser. No. 09/209,995 filed Dec. 11, 1998, now U.S. Pat. No. 6,256,967, which is a continuation of U.S. Provisional Patent Application Serial No. 60/098,124 filed Aug. 27, 1998 now abandoned. The content of such applications is hereby incorporated herein by reference.

FIELD OF THE INVENTION

The present invention relates to automated devices for selecting, filling and capping vials of prescription drugs and dispensing unit-of-use prescription drugs within the same device according to a patient specific order.

BACKGROUND OF THE INVENTION

Generally, patients have been provided with prescriptions in one of two ways. One way is to provide prescriptions that are pre-filled in vials ("unit-of-use drugs") at a remote location and kept in inventory at a pharmacy. These unit-of-use drugs are removed from stock when needed and relabeled with patient specific information. Another method involves filling prescriptions by having a pharmacist hand-dispense the required drugs from a bulk supply and then place a patient specific label on a vial.

There are disadvantages to both of these prescription-filling methods. If pharmacists elect to use unit-of-use drugs, they must carry an inventory of several hundred drug types. Furthermore, they must manage inventory levels and monitor stock for expiring products. Generally, a pharmacist will pay a premium for having the drugs pre-packaged.

On the other hand, filling prescriptions from bulk on an individual basis is very labor intensive and subject to human accounting errors. Further, servicing a large patient population requires large numbers of pharmacists.

Automated prescription-filling apparatus are available that count oral solid prescriptions. In one patented device, drugs are stored in bulk storage canisters in rotary dispenser lines that dispense the drugs. Drugs are dispensed from the canisters into vials. The canister is keyed to a specific storage position within such a device by a mechanical pin arrangement. Provisions are made in the event there is an inability to fill a prescription or order. Once filled, all of the patient's prescriptions are collected and made available as a single order.

In another available apparatus, single countable drugs are automatically and repetitively counted. However, there is no provision in this type of apparatus for placing the drugs in vials. Other apparatus fill prescriptions from a supply of unit-of-use drugs.

In the retail pharmacy market, in particular, there is a noted lack of devices that would serve to automate the prescription filling process. The devices described above work well within the limited field of use each afford. However, no products presently on the market can both retrieve, count and dispense a variety of oral solid drugs in the retail setting.

State-of-the-art automated prescription dispensing apparatus possess several disadvantages. These apparatus do not provide for the dispensing of countable drugs and unit-of-use drugs in the same device. These apparatus do not use machine-readable information to identify a canister with a specific location within the apparatus, thus assuring the return of a canister to the proper location without operator intervention. These apparatus do not optimize the location of a canister within the apparatus based on the frequency of drug use.

SUMMARY OF THE INVENTION

The present invention provides an improved method and apparatus for dispensing prescriptions. The invention eliminates the need for two apparatus to dispense countable solid oral drugs and unit-of-use drugs. The invention provides an improved method for identifying drugs and the drugs' location in the apparatus. The invention further provides an improved method of dispensing drugs into patient accessible containers. The invention still further provides a positive method for preventing over counting of oral solid drugs. To these ends, the invention provides an improved automated prescription filling system.

In an embodiment, the invention provides a system whereby a pharmacist inputs a patient's order including prescription information, National Drug Code ("NDC") number, and patient identification information via a computer terminal. The system processes the information and automatically fills one or more vials with one or more drugs, and then automatically labels and caps the vials containing drugs, pursuant to the pharmacist's order. The system processes the information and also automatically dispenses one or more unit-of-use drugs, if ordered. The order is accumulated in a patient receptacle and presented to the pharmacist as the patient's complete order, ready for pick-up or delivery.

In an embodiment, the invention provides that a system for accompanying the foregoing consists of at least one line of machines that will automatically fill, label, cap, and sort vials of different sizes with one or more prescriptions in accordance with a patient order. This same machine will dispense unit-of-use drugs. Patient prescriptions are accumulated in a patient specific receptacle.

In an embodiment, the invention provides a system whereby countable solid oral drugs are dispensed from multiple canisters, in which the drugs are stored in bulk, into vials for delivery to the patient. Means are provided to prevent over counting drugs.

In another embodiment, the invention provides an improved apparatus for automatically gripping the canisters. Means are provided for gripping, manipulating and releasing canisters in a system designed to automatically dispense prescription drugs.

In yet another embodiment, the invention provides a method of optimizing canister location. A method is provided by which the canisters are ordered according to the their level of use.

Located at an end of the dispensing line are accumulation receptacles. The accumulation receptacles are used to accumulate a patient's complete order for pickup or delivery. An advantage of the invention is the ability to more efficiently employ technicians and pharmacists for dispensing drugs. Another advantage of the invention is the automation of dispensing a great majority of otherwise hand-picked items, thus freeing up the pharmacist for greater patient interaction.

DETAILED DESCRIPTION

Figure 5:
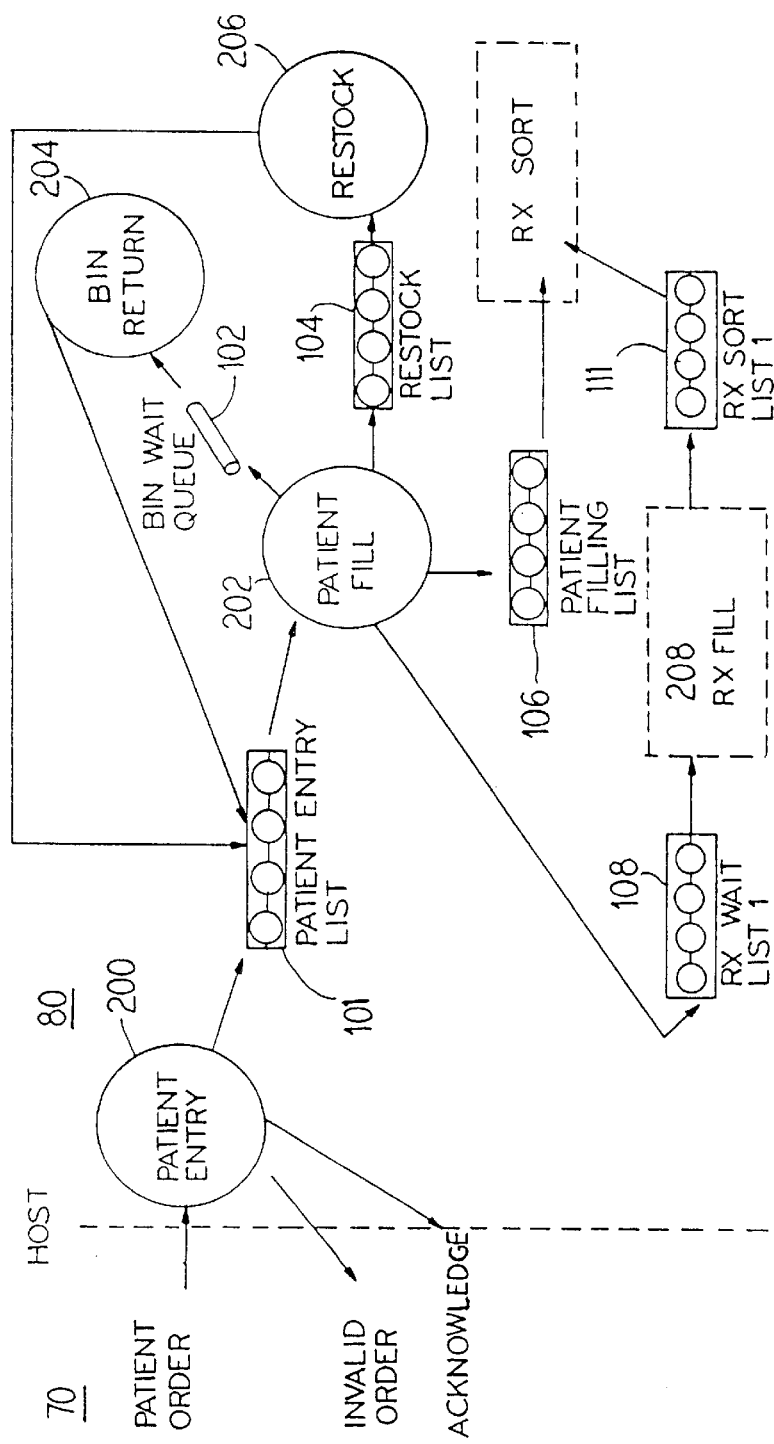
FIG. 5 is a flow diagram for the method of the system of FIG. 1.
Figure 6:
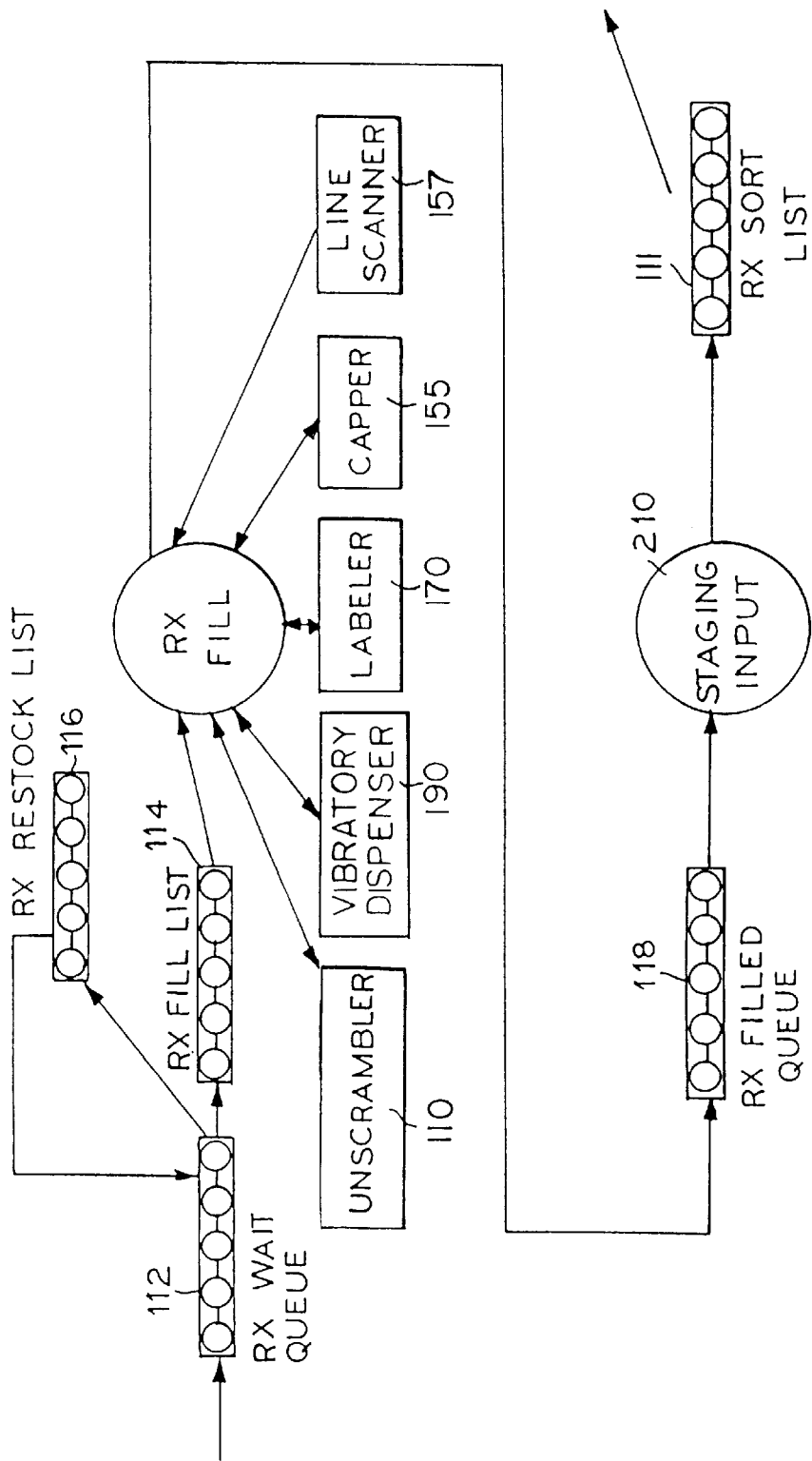
FIG. 6 is a flow diagram for the prescription fill method of the system of FIG. 1.
Figure 7:
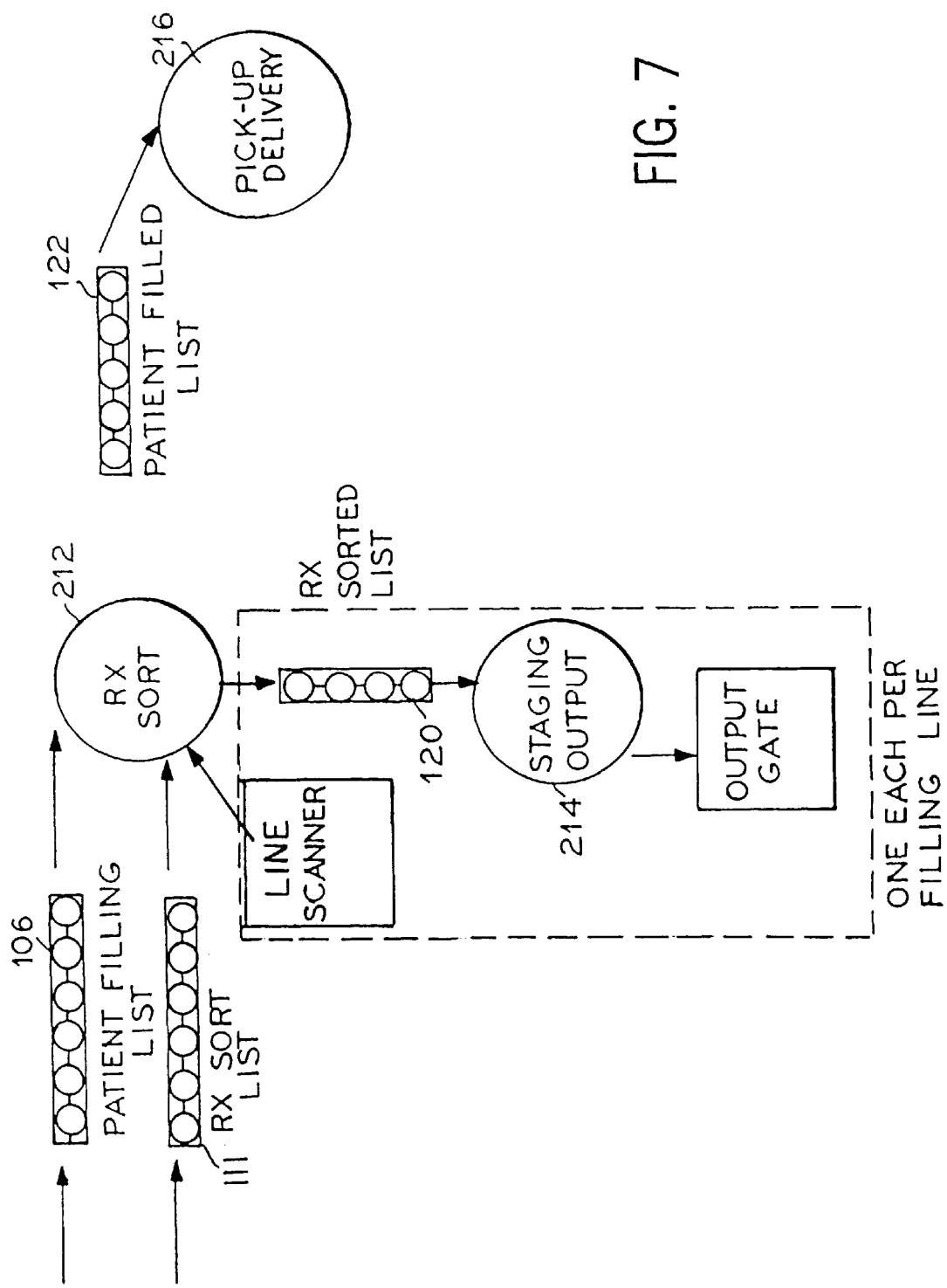
FIG. 7 is a flow diagram for the prescription-sort method of the system of FIG. 1.

In accordance with the invention, a system is provided for dispensing prescriptions, preferably for outpatients, wherein the system packages an order of one or more prescriptions in view of patient prescription information and then presents a complete patient's order to a pharmacist for pick-up or delivery. In accordance with the principles of the present invention, a system is illustrated in FIGS. 1–4. Flow diagrams for the methods of such a system are illustrated in FIGS. 5–7. Processes employed in the system are described below.

Figure 1A:
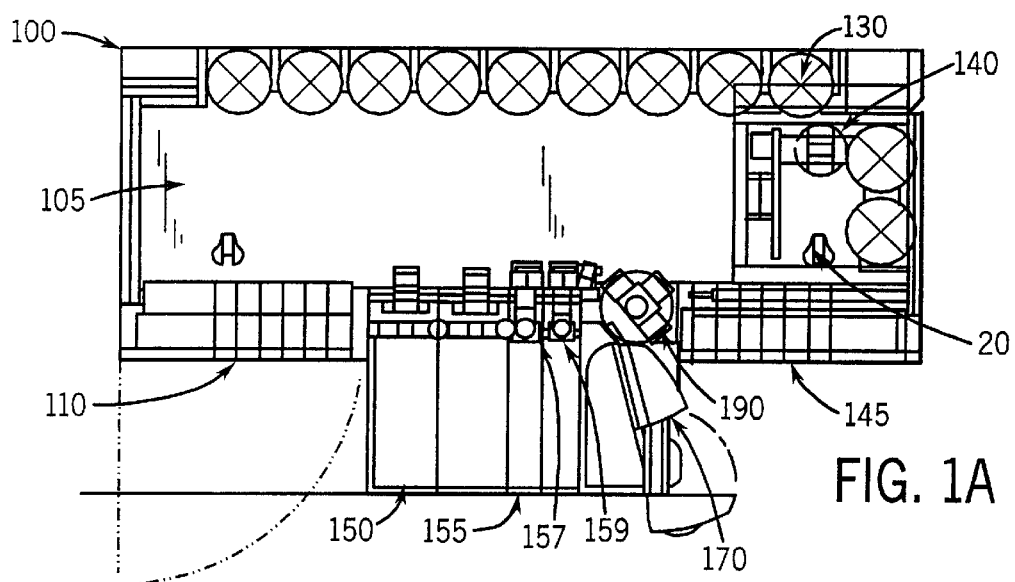
FIGS. 1A, 1B and 1C are schematics for a system in accordance with the principles of the present invention.
Figure 1B:
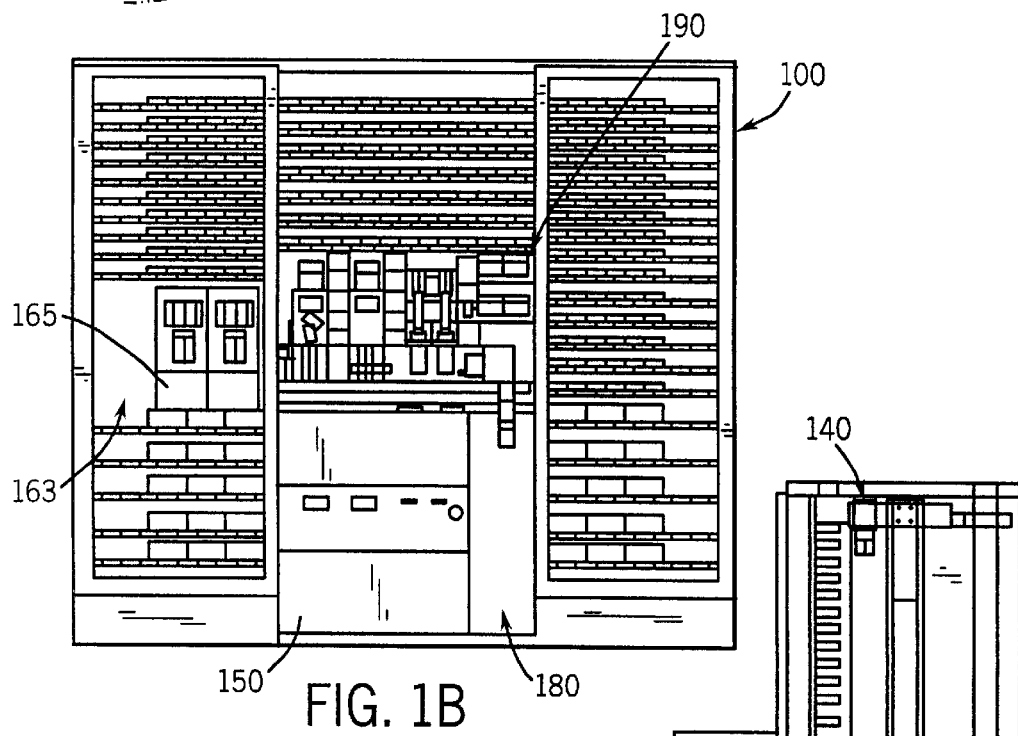
Figure 1C:
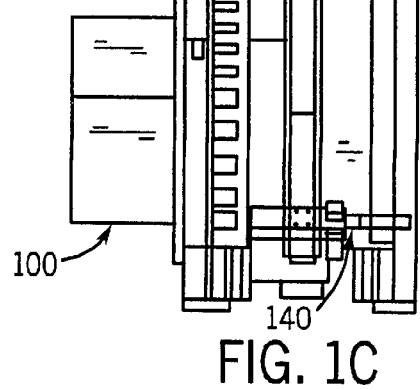

As illustrated in FIG. 1, a system 100 is provided which includes at least one line 105 of machines that can automatically fill, label, cap, and sort vials in accordance with a patient's prescription order under the control of an appropriate control system. While one line is depicted in the illustrated embodiment, the present invention encompasses any number of lines. The apparatus of the invention includes numerous components that are integrated into a singular process. These components are described in further detail.

Robotic Pick-and-Place Unit. Central to the system 100 is a robotic pick-and-place unit 140 ("robotic assembly") that is used to manipulate and transport vials, canisters, and bins, as further described below, within the system. The robotic assembly 140 includes a drive mechanism that moves a gripper assembly 20 along any axis of an orthogonal coordinate system (e.g. the x, y or z axes). The drive mechanism typically includes means for moving the gripper assembly along a plurality of tracks, rails, screws or guides that are oriented along the x, y and z axes of an orthogonal coordinate system. The movement means may include an electric motor, a pneumatic motor, a servo mechanism, or other means for moving the gripper assembly. A controller 180 controls the positioning of the robotic assembly 140, and thus the gripper assembly 20 and the operation of the gripper assembly 20. In this way the gripper assembly is positioned to pick a vial, canister or bin. Vials, canisters or bins are picked by the action of the gripper assembly 20 grasping these objects, lifting them from the rest position and transporting them to a new rest position.

While only one robotic assembly 140 may be used to pick and place vials, canisters, and bins, it is also envisioned that more than one robotic assembly 140 may be used. For example, one robotic assembly 140 may be used for each class of items to be picked and placed. Preferably, one robotic assembly 140 is used to pick and place vials, while another robotic assembly 140 is used to pick and place bins and canisters. Where more than one robotic assembly 140 is used, the robotic assemblies may act simultaneously in performing the assigned function.

Gripper Assembly. The gripper assembly 20 includes means which are actuated to grasp objects. Preferably, the gripper assembly 20 includes movably opposed fingers and means for moving the fingers together and for separating the fingers. The movement means includes air cylinders that are double acting in that compressed air is applied to the cylinder to move the fingers together and then to separate the fingers. More than one air cylinder may be used. However, preferably, a spring may be used to replace the action of an air cylinder in either moving the fingers together or in separating the fingers. It is also anticipated that more than one gripper assembly may be employed in a system made according to the principles of the present invention.

Figure 2A:
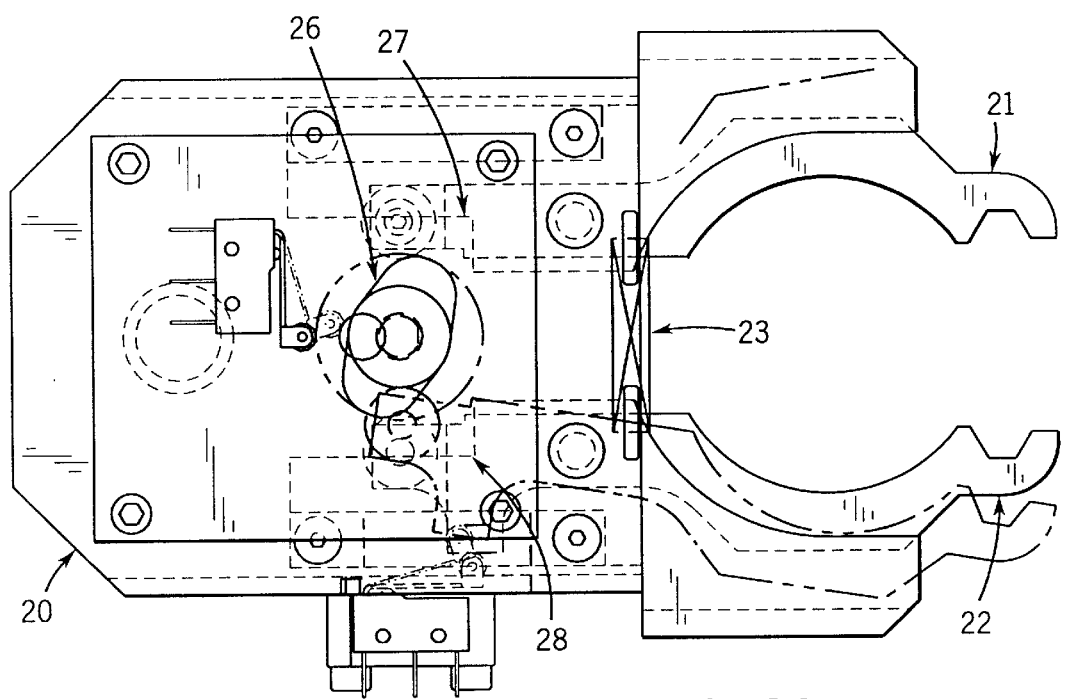
FIGS. 2A, 2B and 2C are schematics for a canister gripper in accordance with the principles of the present invention.
Figure 2B:
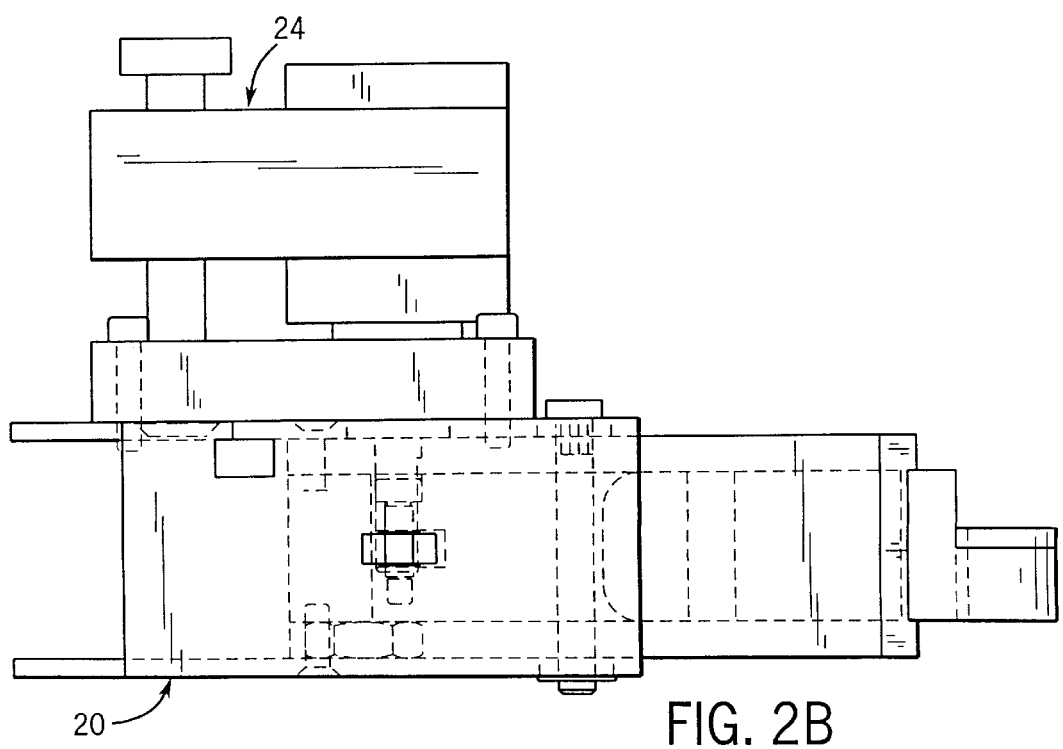
Figure 2C:
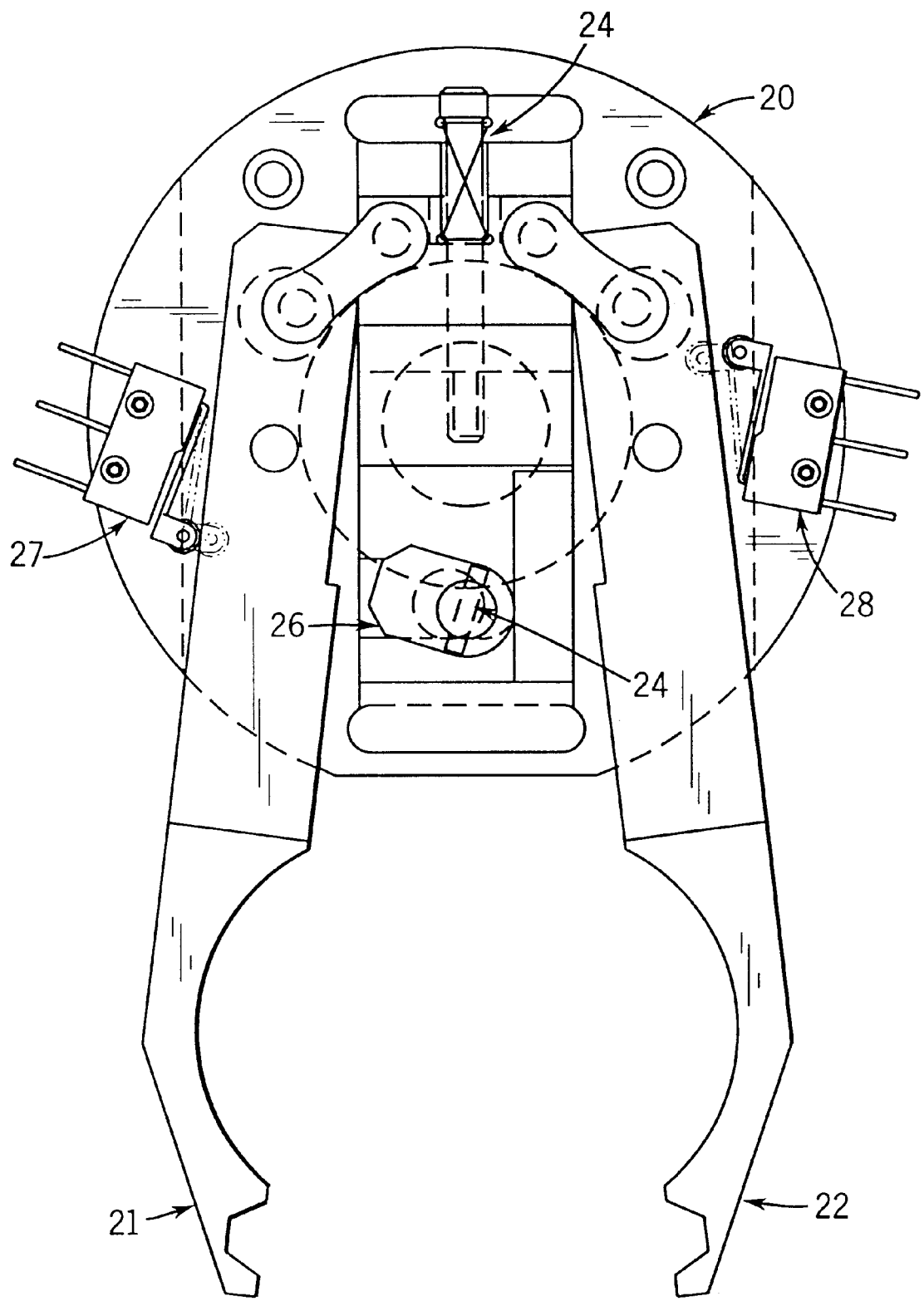

An embodiment of a gripper assembly 20 made in accordance with the principles of the present invention is depicted in FIGS. 2A and 2B. The gripper assembly 20 includes flexible, or compliant, fingers 21, 22 that are generally opposed. A rotary cam 26 operates to move the fingers 21, 22 towards each other, and a spring 23 is used to return the fingers to an open position when the fingers are not being actuated by the rotary cam 26. Means 24 are provided to rotate the cam 26. Typically, the rotating means include an electric motor, but an air driven motor, or solenoids, either air or electric actuated, may be used. The gripper assembly 20 has a simple open/close action. The opened or closed position of the fingers 21, 22 is sensed by limit switches 27 and 28 that are positioned to contact the cam 26. Alternately, the limit switches 27, 28 can be positioned to contact the fingers 21, 22, respectively. As the cam 26 rotates, and based on the shape of the cam, the cam will push the fingers 21, 22 to the closed position. A limit switch 27 contacting the cam 26 will similarly be pushed closed. When the cam 26 rotates to release the fingers 21, 22, the fingers 21, 22 are returned to the opened position by the spring 23. The limit switch 28 contacting the cam 26 will similarly be allowed to open. When the limit switch opens or closes, an electrical signal is provided to a controller thus registering the opened or closed status of the gripper assembly fingers 21, 22. An alternate embodiment of a gripper assembly 20 made in accordance with the principles of the present invention is depicted in FIG. 2C.

The gripper assembly of the present invention has many advantages over prior art devices. For example, the gripper assembly of the present invention prevents crushing of gripped objects. Also, the gripper assembly of the present invention prevents the burn out of the gripper assembly motor.

Vial Unscrambler. The first machine position in the system 100 is a vial unscrambler 110. In such a machine vials are dumped into a hopper 150 in bulk form. The hopper 150 preferably is large enough to hold a quantity of vials, ranging from about one hundred to several hundred, or more. Multiple hoppers 150 may be used for each vial size used, if more than one vial size is required.

The unscrambler 110 orients a vial upright in a separator and places the vial in a pickup area ready to be picked by the robotic assembly 140 and moved to a labeler 170. The unscrambler 110 can also be equipped to shoot a blast of air in the vial, cleaning debris that might be present. The unscrambler 110 includes a machine similar to an Omega Model number 20-LP manufactured by Omega Design Corporation, 211 Philips Road, Lionville, Pa., or a New England Machinery Model NEHE-50J or NEHB-50AJ manufactured by New England Machinery, Inc., 6204 29th Street East, Bradenton, Fla. Generally, the unscrambler 110 prepares the vials for the next step in the process of dispensing prescriptions.

Figure 2D:
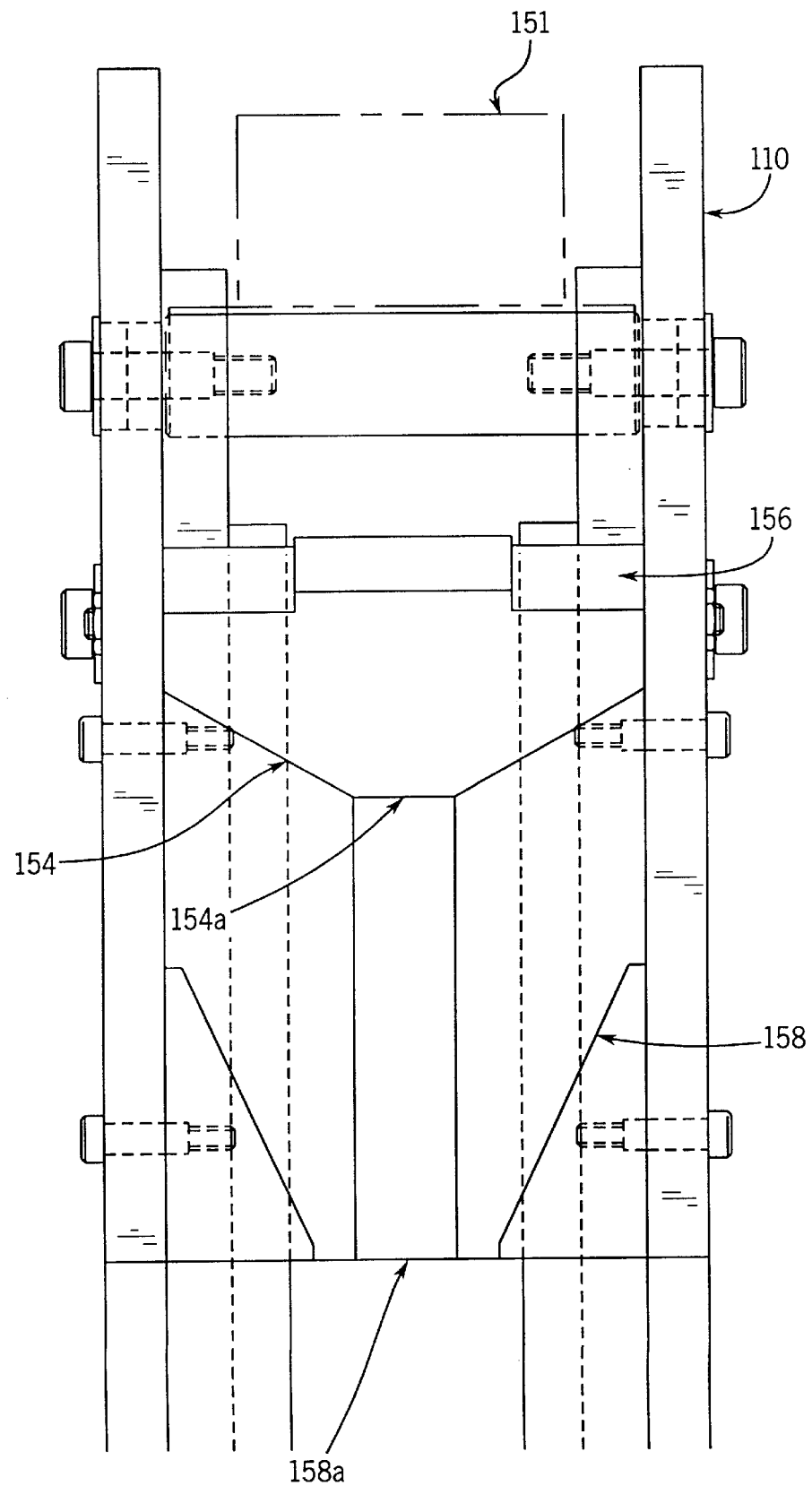
FIG. 2D is a schematic of an unscrambler in accordance with the principles of the present invention.

An alternate unscrambler 110 is illustrated in FIG. 2D. The unscrambler 110 includes storage means, release means, and orientation means. Storage means includes a tube 151 which stores vials in a horizontal position. Release means includes a moveable pin 156 which serves to hold a vial at the bottom of the tube 151 and release the vial from the bottom of the tube 151 upon movement of the pin 156. Alternately, the pin 157 may be replaced by a rod or bar. Orientation means includes a dual chute arrangement having a first chute 154 and a second chute 158. Each chute 154, 158 has an opening 154a, 158a, respectively, through which a vial may pass. The opening 154a is sized such that a vial must be in a near vertical orientation before the vial can pass through the opening 154a. The opening 158a is sized to be larger than the opening 154a.

Additionally, vials may be placed into a device which provides storage and delivery means in an orientation that requires no further unscrambling. In such a device, unscrambling of vials is accomplished by an operator who places the vials into the device in a properly oriented position. Storage and delivery means may include, for example, a tube which allows for a vertical stacking of vials such that a vial may be laced into the top of the tube in an oriented position and subsequently removed from he bottom of the tube in the oriented position.

Vial Labeler. After unscrambling, the vial is labelled by a label machine 170 ("labeler"), such as Avery Model ALX 910 available from Avery 65 Label Division, McLachlan Drive, Rexdale, Ontario, Canada or Willett Model 2600 manufactured by Willett America, Inc., 4901 Northeast Parkway, Fort Worth, Tex. The labeler 170 is located upstream of the vibratory dispenser 190 as shown, or it can be located under the vibratory dispenser 190 to label vials during or preferably immediately prior to filling. The labeler 170 prints human readable information, as well as bar code information on demand. The label information is kept in a database and contains drug description, as well as any warning statements. After the label is printed a reader can be provided associated with the labeler 170, to verify the contents of the label by reading the printed bar code. It is preferred that only after reading the barcode will a process for filling prescriptions of the present invention be allowed to proceed to the next step in the process.

Canister. The canister used in the invention aids integration of the other apparatus features with the methods for dispensing prescription drugs. The canister may be of any suitable design that allows dispensing of countable oral solid drugs within an automated drug dispensing system. The canister may include a label used to identify the contents of the canister.

Figure 3A:
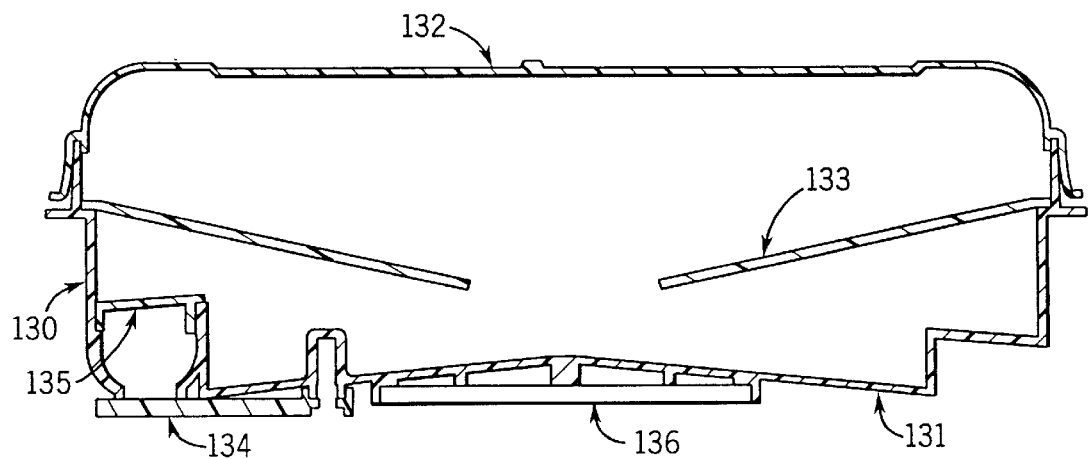
FIGS. 3A and 3B are schematics for a canister in accordance with the principles of the present invention.
Figure 3B:
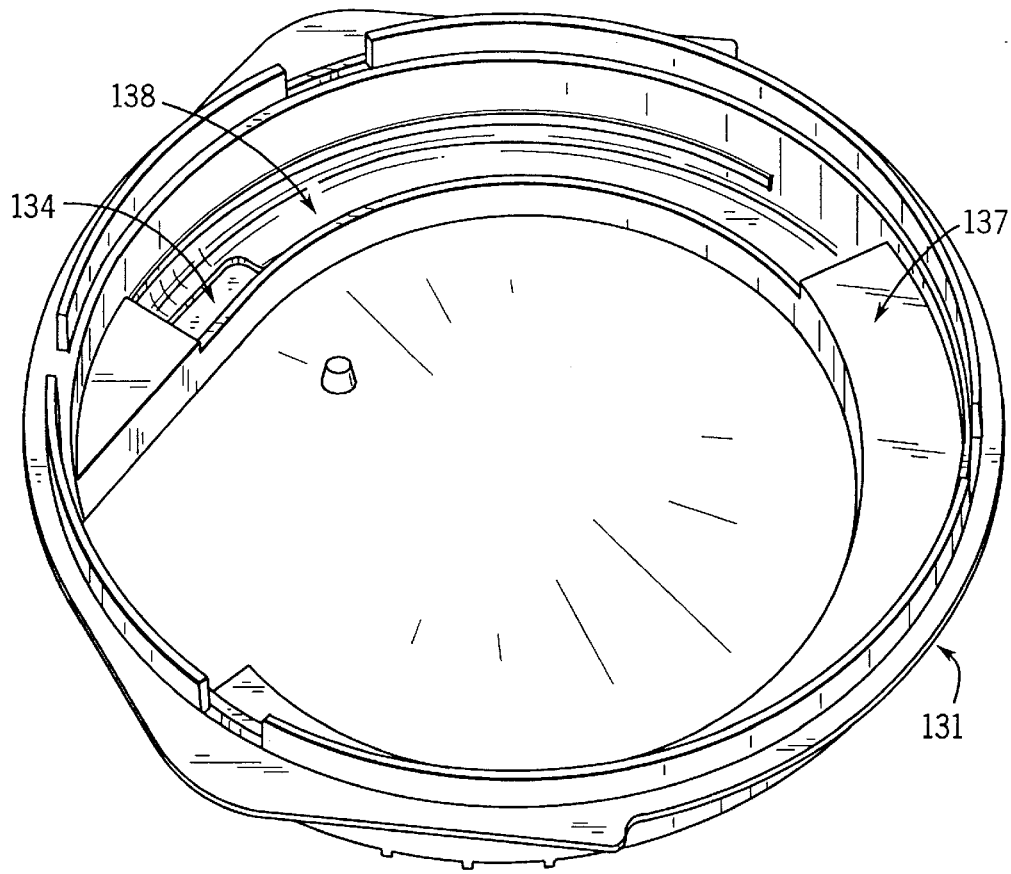

A canister 130 made in accordance with the principles of the present invention is illustrated in FIG. 3. The canister 130 is preferably an assembly of components that includes a bowl 131, lid 132, an optional funnel 133, gate 134, an optional ramp lid 135, and washer 136. The canister 130 is designed with an internal vertical acceleration ramp 137 to facilitate separation of solid drugs within the canister 130. This design allows gravity to accelerate the movement of the drugs to a rate faster than the transport rate of the canister 130 from the canister's storage location to a vibratory dispenser 190 and thus creates a greater distance interval between drugs. As the canister 130 is being moved from the canister's storage location, momentum will move the drug up the acceleration ramp 137 and gravity will accelerate the drug down the end of the acceleration ramp 137. The acceleration ramp 137 may extend part-way around the circumference of the canister 130, or it extends several times around the circumference in a spiral fashion. The drug then continues down a dispensing ramp 138 to the gate 134. The optional ramp lid 135 covers the dispensing ramp 138 and prevents a drug from moving onto the dispensing ramp 138 by a path other than the path described above. Alternately, the dispensing ramp 138 may be provided with a side wall that is extended perpendicular to the plane of the dispensing ramp 138 and, thus, will prevent a drug from prematurely moving onto the dispensing ramp 138.

The preferred canister 130 provides singulation control to the movement of drugs through the canister 130 and out the gate 134. Singulation control is the process by which drugs move through the canister 130 in a nearly single-file fashion. Means for singulation control is provided by the width of the acceleration ramp 137 and the dispensing ramp 138. By providing the proper ramp width, the movement of drugs in other than a nearly single-file fashion is prevented. The proper ramp width may in fact be more than one width and may, for example, be a width that is tapered from a largest width to a smallest width. It may also be preferable to design canisters for specific drugs based on the drug size and shape. The drug size and shape may be used to select a proper ramp width. Singulation control may be aided by maintaining the acceleration ramp 137 and the dispensing ramp 138 surfaces on which drugs move at an angle with respect to horizontal. The angle is selected so that the edge of the ramp surface closest to the center of the canister 130 is above a horizontal plane which intersects the edge of the ramp surface farthest from the center of the canister 130.

In order to positively retain solid drugs in the canister 130, while it is transported by the robotic assembly 140 to and from the canister's storage location, the gate 134 is closed and fixedly held to remain in a closed position while the canister 130 is in motion or is being stored. The gate 134 can be closed when the total count is reached to prevent further solid drugs from falling into the vial. It will not be opened until the counting mechanism is activated so that any solid drugs on the gate 134 will be counted into the vial accurately. The gate 134 may include, for example, a shutter covering an exit hole, a horizontally operated gate, or a vertically operated gate. As an alternative to closing the gate quickly to prevent an extra drug from falling into the vial, an air jet can separately be used to push the tablet that would raise the drug count to one more than the total count back from the gate into the canister. The air jet comprises an air nozzle and an electrically activated valve assembly.

Unit-of-use Bin. The unit-of-use bin 145 used in this invention may be of any suitable design that allows dispensing of pre-packaged unit-of-use drugs within an automated drug dispensing system. The unit-of-use bin 145 may include a label used to identify the contents of the bin. Alternately, the label used to identify the contents of a bin may be positioned on the dispensing system 100 at the place of unit-of-use bin 145 storage. Such a labeling procedure provides dynamic location control and allows the placement of any unit-of-use drug in any unit-of-use bin 145.

Figure 4:
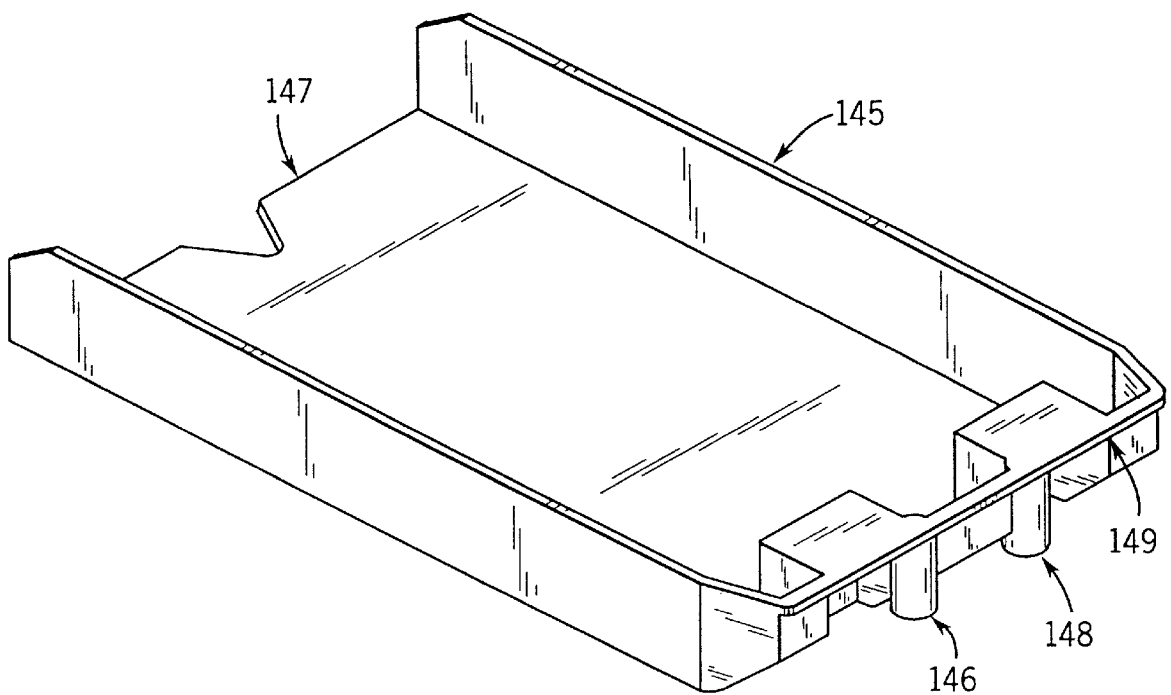
FIG. 4 is a schematic for a unit-of-use bin in accordance with the principles of the present invention.

A preferred unit-of-use bin 145 made in accordance with the principles of the present invention is illustrated in FIG. 4. The unit-of-use bin 145 provides a means to store and dispense pre-packaged drugs. The unit-of-use bin 145 is designed to hold one package of a pre-packaged drug. The unit-of-use bin 145 includes an open end 147, a closed end 149, and bosses 146,148. The open end 147 of the unit-of-use bin 145 provides easy access to refill the unit-of-use bin 145 with a single package of a prepackaged drug. The gripper assembly 20 of the robotic assembly grasps the unit-of-use bin 145 at the bosses 146, 148. In this way, the unit-of-use bin 145 is transported from the unit-of-use bin's 145 storage location to an accumulation receptacle 165 in a process that will be further described below. The contents of the unit-of-use bin 145 may be transferred to the accumulation receptacle 165 by scraping the contents, dumping the contents, or vibrating the contents of the unit-of-use bin 145 into the accumulation receptacle 165.

Dispensing Countable Oral Solid Drugs. From the labeler 170, the robotic assembly 140 transports a vial to the vibratory dispenser 190. Preferably, the robotic assembly 140 selects and retrieves canisters 130 containing oral solid drugs. The robotic assembly 140 further includes a gripper assembly 20 that grips the canister 130 during the process of moving the canister 130 from a storage position to an engagement position with the vibratory dispenser 190. As described above, it is anticipated that more than one robotic assembly 140 may be used in the system 100.

The vibratory dispenser 190 further includes at least one drive unit, which couples to the canister 130 via a quick coupling mechanism. The quick coupling mechanism further includes, for example, mechanical latches, magnetic couplings, or electromagnetic couplings which provide the means by which the canister fixedly attaches to the drive unit.

The vibratory dispenser 190 still further comprises a counting mechanism. The counting mechanism comprises a sensor that registers when a solid oral drug is in the sensor's path. The registration of a drug is cumulative and is the drug count.

In operation, the canister 130 is vibrated by the drive unit in order to move countable solid drugs from the canister 130 into a vial. A controller 180 controls the vibration of the drive unit. The vibration of the drive unit is controlled to a specific range of amplitudes, frequencies, or both. Initially the amplitude and frequency are set to values that are preset based on a drug's and canister's characteristics and that are stored in a host computer which is further described below. The drug is counted by the counting mechanism as it is dispensed. This drug count is compared to the total count that is to be dispensed according to the patient order. The amplitude, frequency, or both, of the single drive unit vibrations are decreased as the drug count nears the total count.

The control of the drug fill rate, from the canister 130 to the vial, is critical to the ability to accurately dispense drugs. The practice has been to tune the canister inertia, or the spring rate of the drive mechanism, or both, to resonate close to the drive frequency ("resonance frequency"). The drive frequency may, for example, be set equal to the supply line frequency, such as 60 hertz, of the voltage applied to the single drive unit.

The amplitude of the canister 130 vibration is controlled by modulating the power supply to the single drive unit. This control can be accomplished by variation of the voltage with an auto-transformer or by phase chopping which limits the power directly by shutting off the power for part of each power cycle (e.g. 6 milliseconds on for each 8.3 milliseconds per half cycle at a 60 hertz frequency).

A variable frequency may be applied to allow the canister 130 to vibrate. This allows for compensation in the frequency due to a change in the effective inertia of the canister. The effective inertia of the canister will change due to the amount of drug present in such a container. As a drug is dispensed, the effective inertia reduces and the frequency can be adjusted to compensate for this change. In this way the desired fill rate can be maintained regardless of the amount of drug present in the canister 130. The frequency may also be varied to change the dispense rate of the canister. The method of dispensing solid oral drugs is depicted in the flow chart of FIG. 5.

The control of the amplitude and frequency of the vibration of a canister 130 may include a method and apparatus, such as a sensor, for monitoring the vibrations. For example, a shutter may be included on the canister which interposes a light source and photodetector positioned adjacent to the vibratory dispenser 190. The light source is blocked intermittently as the canister 130 vibrates and a corresponding intermittent signal is generated by the photodetector. The signal may be monitored and used to control the vibration and frequency.

The control of the amplitude and frequency of the vibration of a canister 130 may include selection of amplitude, frequency or both from a table of such values. The controller 180 may be provided with a list of amplitudes and frequencies that are tabulated according to drug and are identifiable according to the drug to be delivered. When a drug is to be dispensed by the vibratory dispenser 190, the controller 180 sets the amplitude, frequency, or both the amplitude and frequency of the vibration to the value contained in the list.

Fill Rate Control. In order to minimize the fill time, the drive frequency is increased slowly until it approaches the maximum detection rate of the sensor. The drug count is a discrete integer count registered in a fixed sampling time. A moving average is used as the basis to predict when the last drug will fall through the sensor. As the drug count approaches the total count, the time to terminate the fill is predicted as a fraction of the sampling time of the counting mechanism. The vibration of the canister 130 or unit-of-use bin 145 by the vibrating dispenser 190 is terminated when the estimated time to terminate is reached. In the expected event that the count is short one or two solid drugs, the drive mechanism is restarted as the last used frequency for a short time pulse, 25 milliseconds to 100 milliseconds, for example. Then the drive mechanism is turned off at least until the next drug count registers. If the count is still short, this process is repeated.

Vial Fill Sequence. The robotic assembly 140 brings the vial under a filling position of the vibratory dispenser 190 and a signal from the controller system activates the appropriate canister as required. The doses are counted into the vial until filling is complete.

Once a vial is filled, the vial is transported to a capping machine 155 ("capper") by the robotic assembly 140. The capping machine 155 preferably applies a child-resistant cap to the vial.

As illustrated, each line includes a line scanner 157 and a wrap belt or drive roller 159. Both the wrap belt and drive roller serve to spin a vial around so that a code on the vial label can be read by the line scanner 157. The line scanner 157 verifies the legibility of the code on the label and confirms the prescription number to the control system. Preferably, the barcode on the vial label is read just after the label is applied and before the canister 130 is retrieved. This sequence of events provides for verification of the label and that the drug called for on the label is in stock before the canister 130 is retrieved.

After the vial is capped, a sensor associated therewith verifies that the cap has been properly applied. The capper 155 preferably includes a reservoir that is sufficiently large to store one full shift's supply of caps. The capping machine can be one similar to Kalish Cap Mark III manufactured by HG Kalish Inc., 6535 Mill Creek #62, Mississauga, Ontario, Canada or Capramatic DLR-1 manufactured by National Instrument Co., 4119 Fordleight Road, Baltimore, Md.

Once a vial has been capped and the contents are verified by the capper sensor, the vial is transported by the robotic assembly 140 to the accumulation receptacle 165 in the accumulation area 163. In the accumulation area 163, two functions can be performed: sorting and ejecting. Vials that have an improper drug count, unreadable labels or improperly sealed caps are ejected. A signal sent by the vibratory dispenser 190, labeler 170, or capper 155 causes a defective vial to be ejected into a reject bin by a blast of a pneumatic air gun if any of the eject conditions are detected. When a vial is ejected, the control system places a refill request with the vibratory dispenser 190 on a priority basis so that another attempt is made to complete the prescription order. Alternately, an operator can be alerted to vials that have an improper drug count, unreadable labels or improperly sealed caps, by information posted by a host computer that is further described below.

Accumulation Receptacles. The accumulation receptacles 165 are bar coded or the accumulation receptacles 165 are identified by a set of x, y, z coordinates specific to their location in the machine 105. The control system assigns at least one accumulation receptacle 165 per patient. If a particular patient has more vials than a single accumulation receptacle can hold, a second or third accumulation receptacle will also be assigned. Where used, the bar code on the accumulation receptacle 165 is read by line scanner 157, and a signal correctly controls the discharge of a specific patient's vial or unit-of-use drug into the accumulation receptacle 165. Alternately, the discharge of a specific patient's vial or unit-of-use drug into the accumulation receptacle 165 can be controlled based on the set of x, y, z coordinates specific to the accumulation receptacle's 165 location in the machine 105. Accumulation receptacles 165 may be stationary or they may be moveable.

Methods. In FIGS. 5–7, the methods for various aspects of the system are illustrated. As illustrated in FIG. 5, a host computer 70 provides a patient's order information to a control system 80. In return, the control system 80 advises the host computer 70 as to whether an order is valid or invalid.

A Patient Entry List 101 is provided, which includes a collection of patient orders received by the control system 80 from the host computer 70. Generally, the orders are organized in a first-in, first-out (FIFO) list. However, when orders receive priority status, such as during a refill as described above, a later order can be placed at the head of the list so that it will be processed first. Also, an order can be removed from the FIFO list if a drug is not in stock, to optimize machine 105 operation, and for any special priority reasons. This ability to modify a FIFO list is characteristic of all FIFO lists or queues used in the present invention.

Each entry on the Patient Entry List 101 includes patient specific information, for identification purposes, one or more prescriptions for a patient, and prescription specific information including, for example, an ("NDC") number for each prescription entered.

A Receptacle Wait Queue 102 is used to temporarily hold a patient's order pending availability of one of the accumulation receptacles 165. This is a FIFO queue and when an accumulation receptacle 165 becomes available, the order held the longest is assigned to that accumulation receptacle 165.

A Restock List 104 is a FIFO list that is used whenever a canister 130 or unit of use bin 145 does not contain a sufficient quantity of drug to fill a patient's order. When such is the case, the unfilled order is removed from the Patient Entry List 101 and placed at the end of the Restock List 104 until the designated canister 130 is filled or an operator chooses to dispense less than the prescribed quantity of drug.

A Patient Filling List 106 is a FIFO list which is used once it has been determined that an order can be filled by the system 100. Once such a determination is made, a patient's order is transferred from the Patient Entry List 101 and placed at the end of the Patient Filling List 106.

Prescription Waiting Lists 108 are FIFO lists that are created when it has been determined that a patient's order can be filled. When such a determination is made, a prescription in a patient's order is placed at the tail end of the appropriate Prescription Wait List 108. Prescriptions are removed from a Prescription Wait List 108 in the order received.

Prescription Sort Lists 111 are randomly accessible lists used once prescriptions have been filled. Once a prescription is filled, the prescription is placed at the end of the associated Prescription Sort List 111.

The Prescription Sort Lists 111 are used by the control system 80, as discussed below, to place vials into the correct accumulation receptacle 165. Prescriptions are randomly removed from these lists as they are placed into the accumulation receptacles 165.

As illustrated in FIG. 6, a Prescription Wait Queue 112 is generally a FIFO list containing listings of prescriptions to be filled.

The Prescription Fill Lists 114 are used when vials are to be filled or unit-of-use drugs are to be dispensed. When an accumulation receptacle 165 becomes available, as discussed below, prescriptions are taken off of the associated Prescription Wait Queue 112 and placed at the tail end of the Prescription Fill List 114. At that time, a vial is positioned on the filling line for the prescription to be filled or a unit-of-use drug is picked. After the prescription is filled and left waiting to enter the accumulation receptacle 165, it is removed from this list.

Prescription Restock Lists 116 are FIFO lists used whenever a prescription cannot be filled from a canister 130 or unit-of-use bin 145. If it is determined, as discussed below, that a prescription cannot be filled, the prescription is transferred from an associated Prescription Wait Queue 112 to this list until the canister 130 or unit-of-use bin 145 is restocked or an operator chooses to dispense less than the prescribed quantity of drug. Then, the prescription is reinserted in a Prescription Wait Queue 112 at the head of the list.

Prescription Filled Queues 118 are used after vials or unit-of-use drugs have passed the line scanners. When such is the case, a prescription is placed at the tail end of the Prescription Filled Queues 118. Each entry in a Prescription Filled Queue 118 is flagged to indicate the specific accumulation receptacle to which the associated vial or unit-of-use drug is to be sent, or if the vial is to be directed to the reject bin, or if the associated vial or unit-of-use drug is to be held for an operator to manually perform an action on the vial or unit-of-use drug. This is a FIFO queue.

As illustrated in FIG. 7, a Prescription Sorted List 120 is used when a vial or unit-of-use drug is about to be dropped into the assigned accumulation receptacle 165.

Prescriptions are transferred to this list from the Prescription Sort Lists 111, as described below, when a determination is made to drop a prescription into an accumulation receptacle 165. Prescriptions are deleted from this list when the prescriptions are dropped into the accumulation receptacle 165.

A Patient Filled List 122 is used after a patient's order has been filled. When such is the case, a patient's order is removed from the Patient Filling List 106 and placed at the tail end of the Patient Filled List 122.

With the foregoing description, of the various lists and queues employed in the control system 80, the various processes employed by the system 100 under the control of the control system 80 will now be described.

Figure 8:
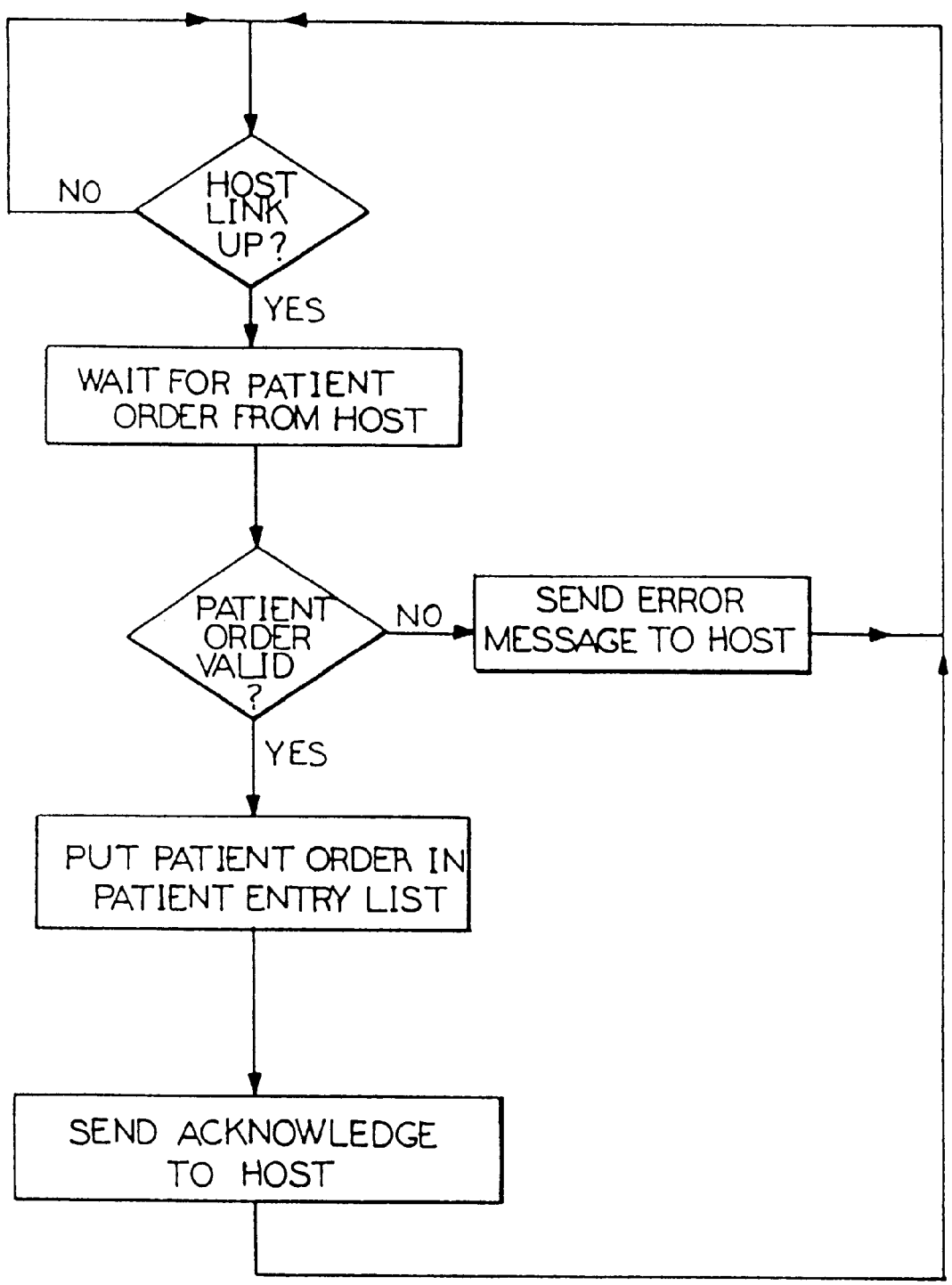
FIG. 8 is a flow diagram for a patient entry process in accordance with the principles of the present invention.

Patient Entry Process. As illustrated in FIG. 8, the patient data entry process 200 can be described as follows: first, it is determined by the control system 80 whether the host computer 70 is linked up thereto. If not, then the control system 80 sits in a "wait" state. If the host is linked up, then the control system 80 waits for a patient's order information to be provided from the host computer 70. Once the patient order is received, the control system 80 determines whether the patient order information is valid. If the information is not valid, then an error message is sent to the host computer to inform the operator of the error. If the patient order information is valid, then the patient's order, compromising one or more prescriptions and patient specific data, is placed on the Patient Entry List 101 as described above and illustrated in FIG. 8. Subsequently, an acknowledgment is sent to the host computer 70 to inform the operator thereof that the patient order was placed on the Patient Entry List.

Canister Location Optimization Process. The canister 130 location within the system 100 is based on the use of the drug stored within the canister 130. Canisters 130 that are more frequently accessed during the dispensing of countable oral solid drugs are stored closer to the location of the vibratory dispenser 190. In this way, time to fill prescriptions is reduced not only for the frequently dispensed drugs, but is cumulatively reduced for all prescriptions filled. In this process, the number of times each canister 130 is accessed is compared for a given time frame. Such a time frame of comparison may be a day, week, month, or longer. The canisters 130 are then listed in an order based on the number of times each canister 130 was accessed during the time frame from most number of times to the least number of times. The canisters 130 are then placed into storage locations, by the robotic assembly 140, in the order determined above.

Figure 9:
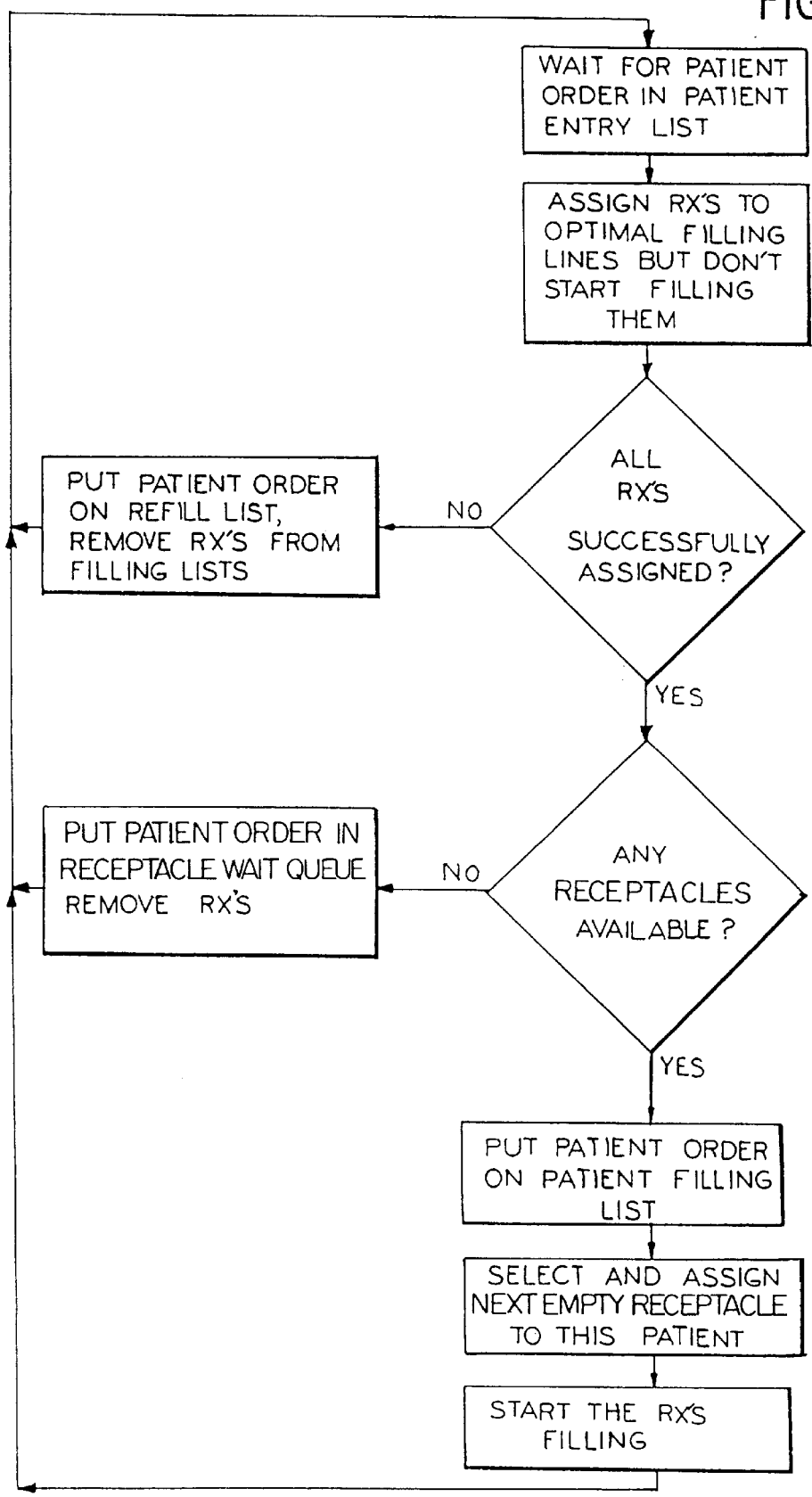
FIG. 9 is a flow diagram for a patient fill process in accordance with the principles of the present invention.

Patient Fill Process. The patient fill process is the process by which a patient's order is divided into the various prescriptions which are then assigned to be filled. As illustrated in FIG. 9, in this process, the system waits for a patient's order to be placed in the Patient Entry List 101. For every patient order in the Patient Entry List 101, a prescription filling assignment is provided so that the fill process is accomplished in an optimal manner. However, the prescriptions are not filled at this time.

Subsequently, it is determined whether the prescriptions are successfully assigned to be filled. If not, the patient order is placed on the Refill List 104 and the prescriptions are removed from the Prescription Filling Lists 114. If the prescriptions are successfully assigned, it is determined whether an accumulation receptacle 165 is available for receipt of the patient order. If an accumulation receptacle 165 is not available, then the patient order is placed in the Bin Wait Queue 102 and the prescriptions are removed from the Prescription Fill Lists 114. The process 202 then again waits for a patient's order information to be presented in the Patient Entry List 101.

If an accumulation receptacle 165 is available, then the patient's order is placed on the Patient Filling List 106 and an accumulation receptacle 165 is selected and assigned to this patient, as discussed below. Subsequently, the process for filling prescriptions commences.

Figure 10:
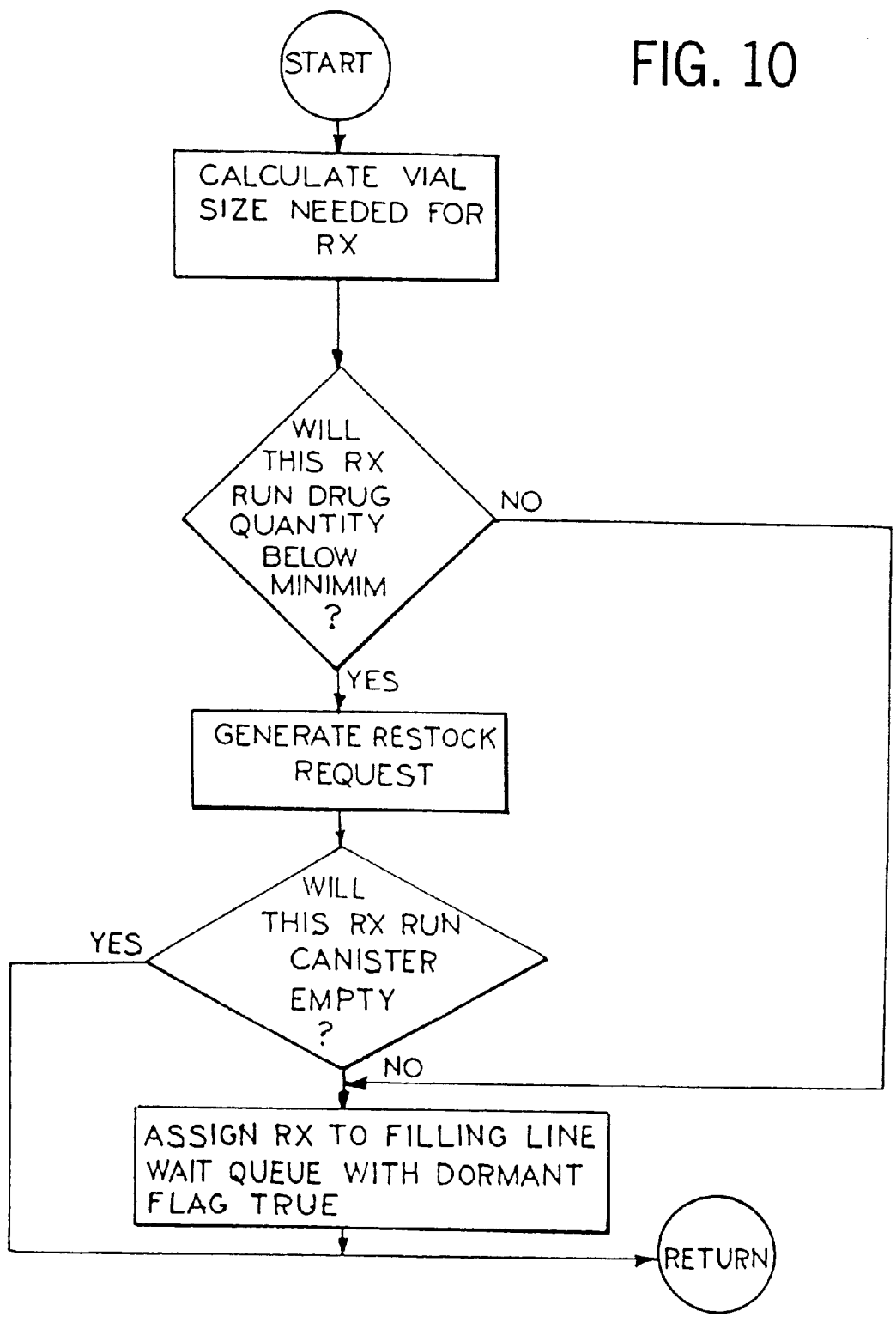
FIG. 10 is a flow diagram for a process for assignment of prescriptions to a filling line in accordance with the principles of the present invention.

Filling Line Assignment. The process used to determine the filling line assignment for a prescription, is illustrated in FIG. 10. It is determined whether the filling of this particular prescription will deplete the drug quantity of the associated canister 130 or unit-of-use bin 145 below a minimum. If the answer is yes, then a restock request is generated to indicate to the system operator or pharmacist to restock the canister 130 or unit-of-use bin 145. Then it is determined whether the prescription will fully deplete the associated canister 130 or unit-of-use bin 145. If the answer is yes, then the process is terminated and non-assignment is indicated.

If it is determined that the filling of the prescription will not run the drug quantity below a minimum or that filling the prescription will not run a canister 130 or unit-of-use bin 145 empty, then the prescription is assigned to the associated Prescription Wait List 108 with a dormant flag set to true. At start up, all accumulation receptacles 165 are empty. An accumulation receptacle is recognized as being the first unassigned accumulation receptacle available 165 (see FIG. 9), as it keeps track of all accumulation receptacle numbers and assigns accumulation receptacles 165 to patient orders.

Receptacle Accumulation Process. A Receptacle Accumulation Process 204 determines if any patient's orders are in the Receptacle Wait Queue 102 and, if so, places such orders at the head of the Patient Entry List so that they are processed next.

Figure 11:
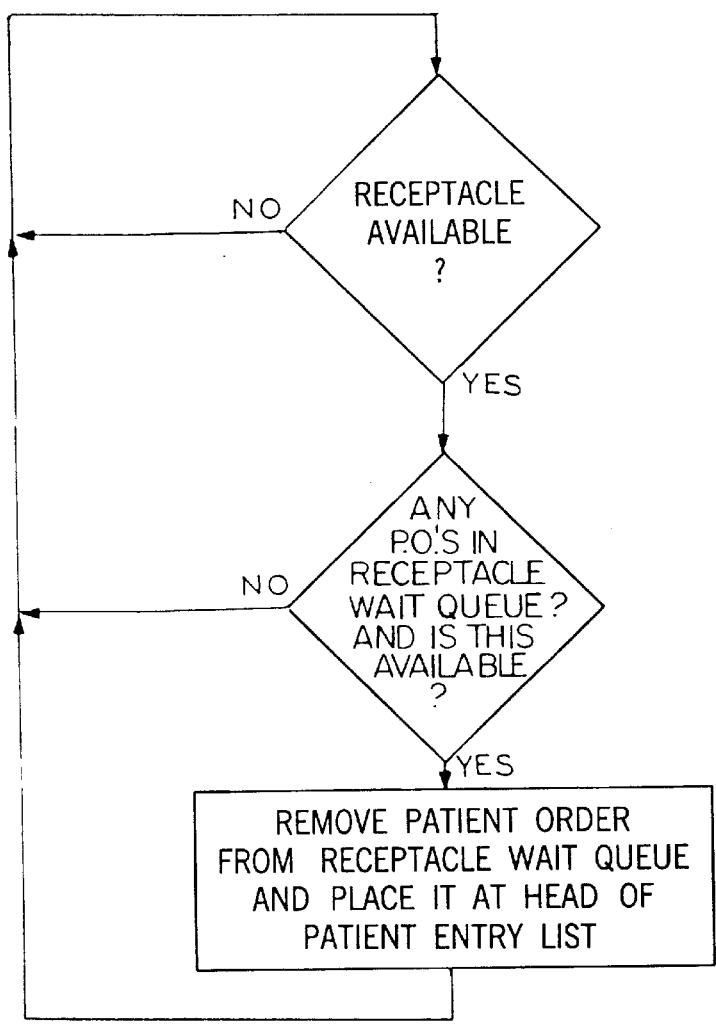
FIGS. 11 and 12 are flow diagrams for a process for selection and assignment of accumulation receptacles in accordance with the principles of the present invention.
Figure 12:
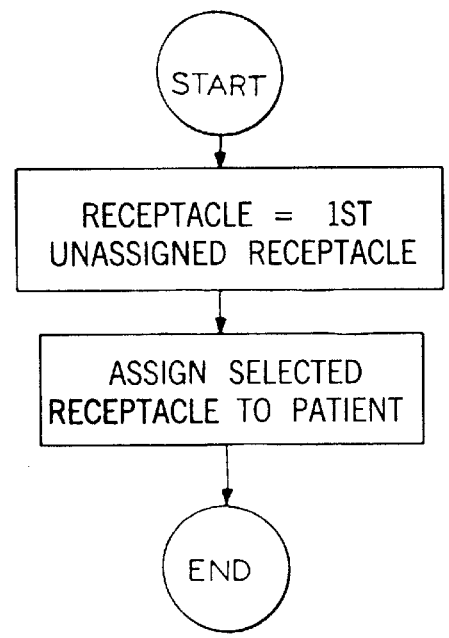

As illustrated in FIGS. 11 and 12, at the beginning of this process it is determined whether an accumulation receptacle 165 is available. A determination is made as to whether any patient orders are in the Receptacle Wait Queue and whether the particular accumulation receptacle 165 is available. If the determination is negative, then the entire process is repeated. Otherwise, the patient's order information is removed from the Receptacle Wait Queue 102 and placed at the head of the Patient Entry List 101. Then the entire process recommences.

Figure 13:
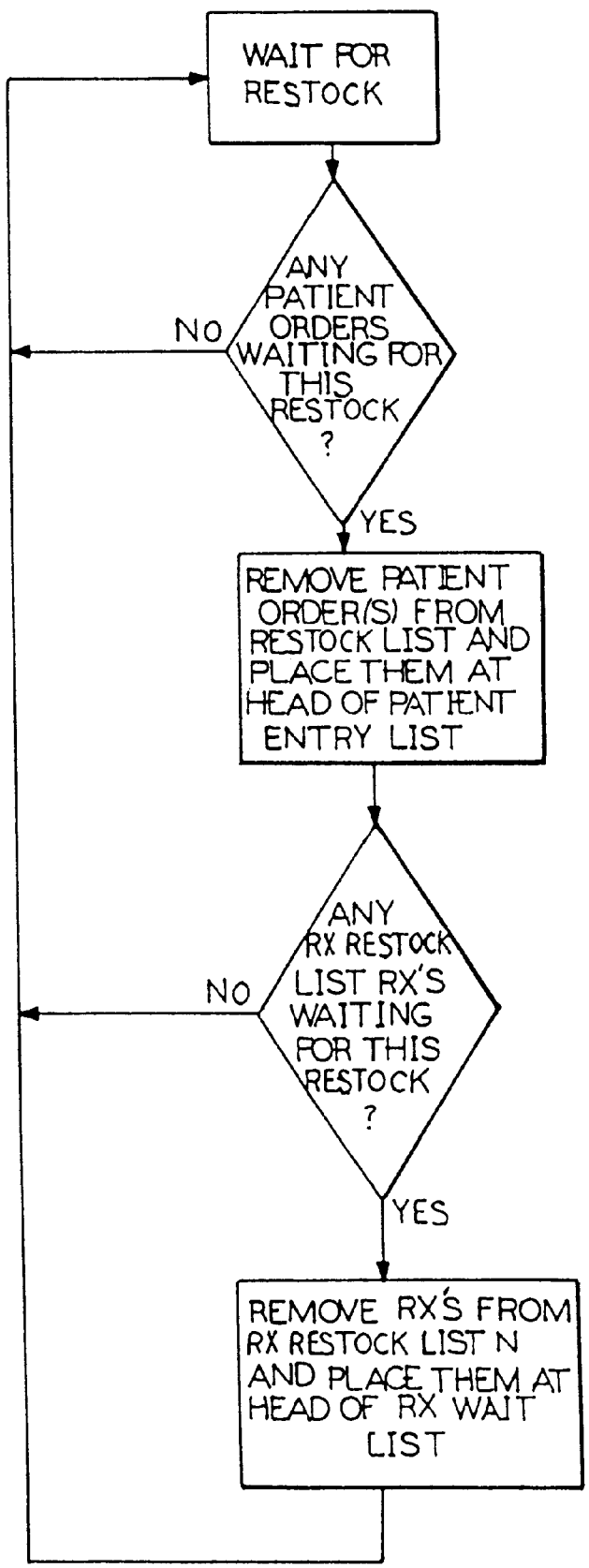
FIG. 13 is a flow diagram for a refill process in accordance with the principles of the present invention.

Restock Process. A Restock Process 206 is invoked if any canister 130 or unit-of-use bin 145 should not have a quantity sufficient to fill any prescription within a patient's order. As illustrated in FIG. 13, the Patient Fill Process 202 takes the order off the Patient Entry List 101, as described above and transfers it to the Restock List 116 until the canister 130 or unit-of-use bin 145 required has been restocked. Alternately, as described above, an operator may intervene and chose to dispense less than the prescribed quantity of drug.

In the Restock Process 206, a continuous routine waits in a loop for indicators that a canister 130 or unit-of-use bin 145 has been restocked. A determination is made as to whether any patient orders in the Prescription Restock List 116 are waiting for the indicated restock. If no orders are waiting for the indicated restock, the routine recommences. Any patient order placed in the Prescription Restock List 116 waiting for this restock is removed and placed at the head of the Patient Entry List 101. Otherwise, it is determined whether any prescriptions on a Prescription Restock List 116 are waiting for the indicated restock. If the answer is negative, then the restock routine returns to the beginning. If the answer is affirmative, the prescriptions are removed from the Prescription Restock List 116 and placed at the associated head of the Prescription Wait Queue 112. Then, the restock routine returns to the beginning to wait for a further indication of a restock.

Figure 14:
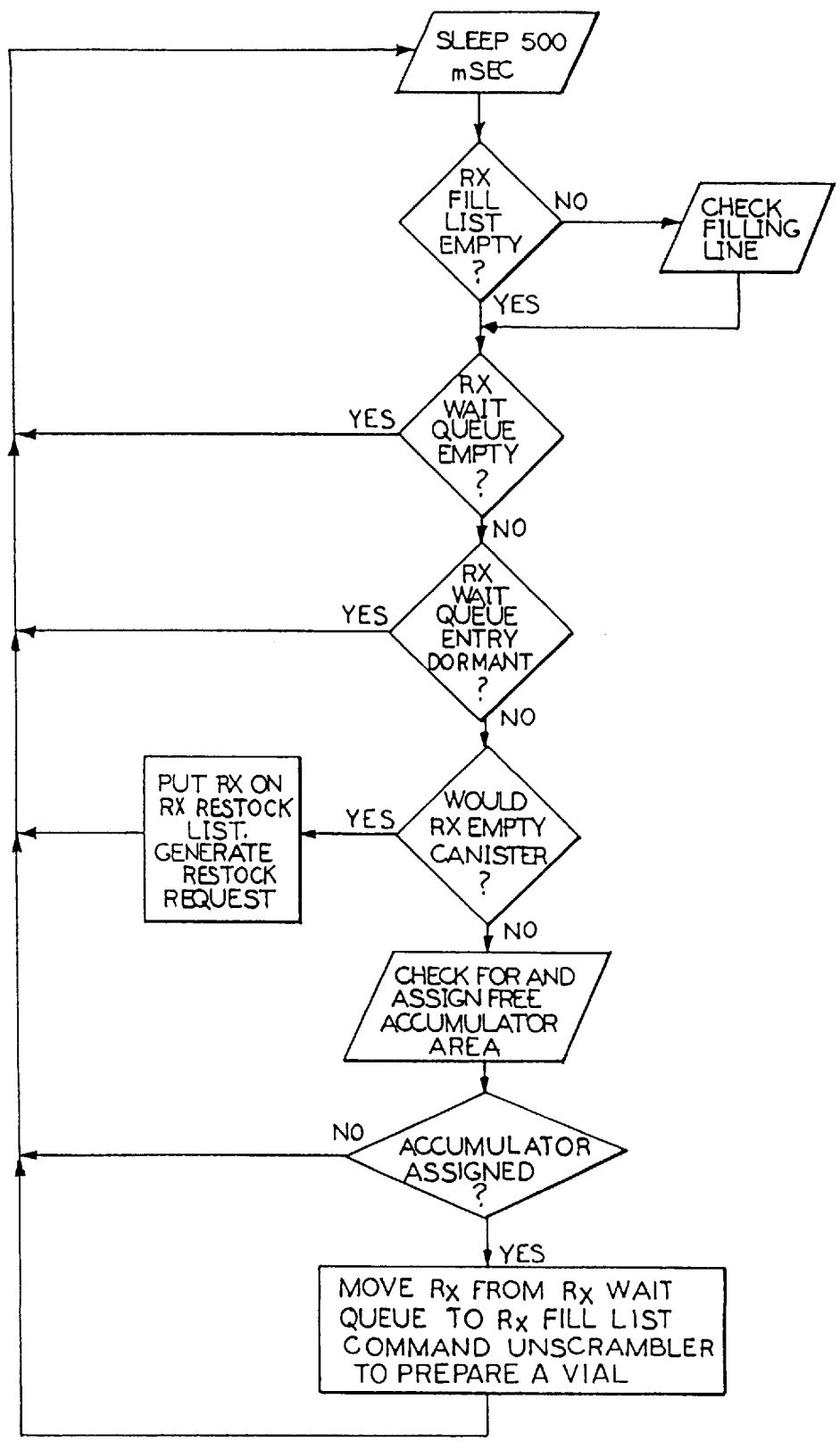
FIG. 14 is a flow diagram for a prescription fill process in accordance with the principles of the present invention.

Fill Process. A Prescription Fill Process 208 is actually a collection of processes, lists, and hardware interfaces as illustrated in FIG. 9. As illustrated in FIG. 14, in this process 208, a routine commences with a wait or sleep state of about 500 milliseconds. Subsequently, a determination is made as to whether an associated Prescription Fill List 114 is empty. If the Prescription Fill List 114 is not empty, then a check is made of the Filling Line Function, as described below.

After the Filling Line Function is checked or if the associated Prescription Fill List 114 is empty, then a determination is made as to whether the associated Prescription Wait Queue 112 is empty. If the Prescription Wait Queue 112 is empty, then the routine returns to the beginning. Otherwise, a determination is made as to whether the Prescription Wait Queue 112 entry dormant flag is set to true. If the Prescription Wait Queue 112 entry dormant flag is set to true, then the routine recommences. Otherwise, a determination is made as to whether the filling of the prescription would empty the requisite canister 130 or unit-of-use bin 145. If the filling of the prescription would empty the requisite canister 130 or unit-of-use bin 145, then the prescription is placed on the associated Prescription Restock List 116 and a restock request is generated. Then the routine recommences.

If filling of the prescription would not empty the requisite canister 130 or unit-of-use bin 145, then a check for an assignment of a free accumulation receptacle 165 is made. If a free accumulation receptacle 165 is not available for assignment, then the routine is recommenced. Otherwise, if a free accumulation receptacle 165 is assignable, then the prescription is removed from the Prescription Wait Queue 112 and moved to the Prescription Fill List 114. At the same time, a command is issued to the associated unscrambler 110 to prepare a vial.

Figure 16:
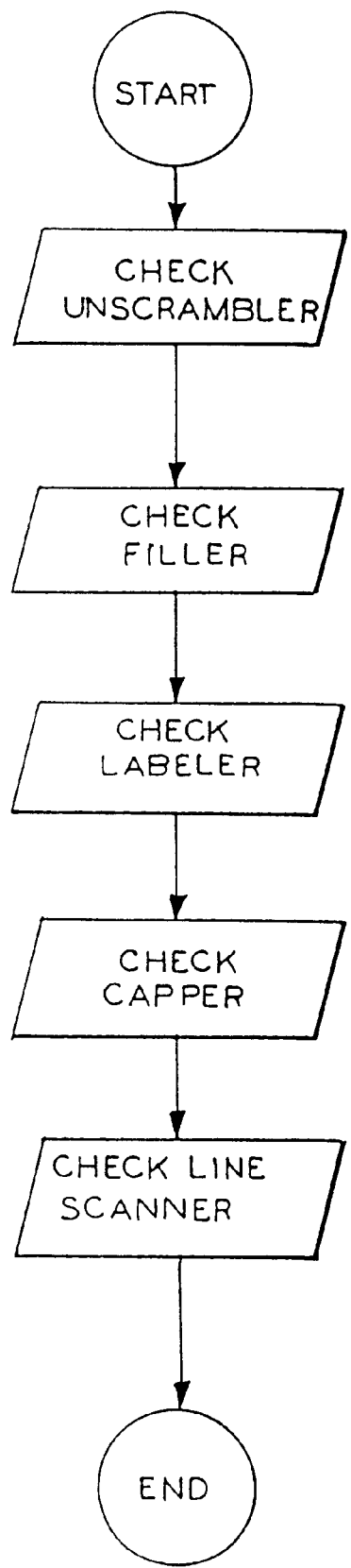
FIG. 16 is a flow diagram for a check filling line process in accordance with the principles of the present invention.

Check Filling Line Function. As illustrated in FIG. 16, the check of a filling line made during a Prescription Fill Process 208 commences with a check of the associated unscrambler 110 and continues with a check of the associated vibratory dispenser 190, labeler 170, capper 155, and line scanner 157.

Figure 18:
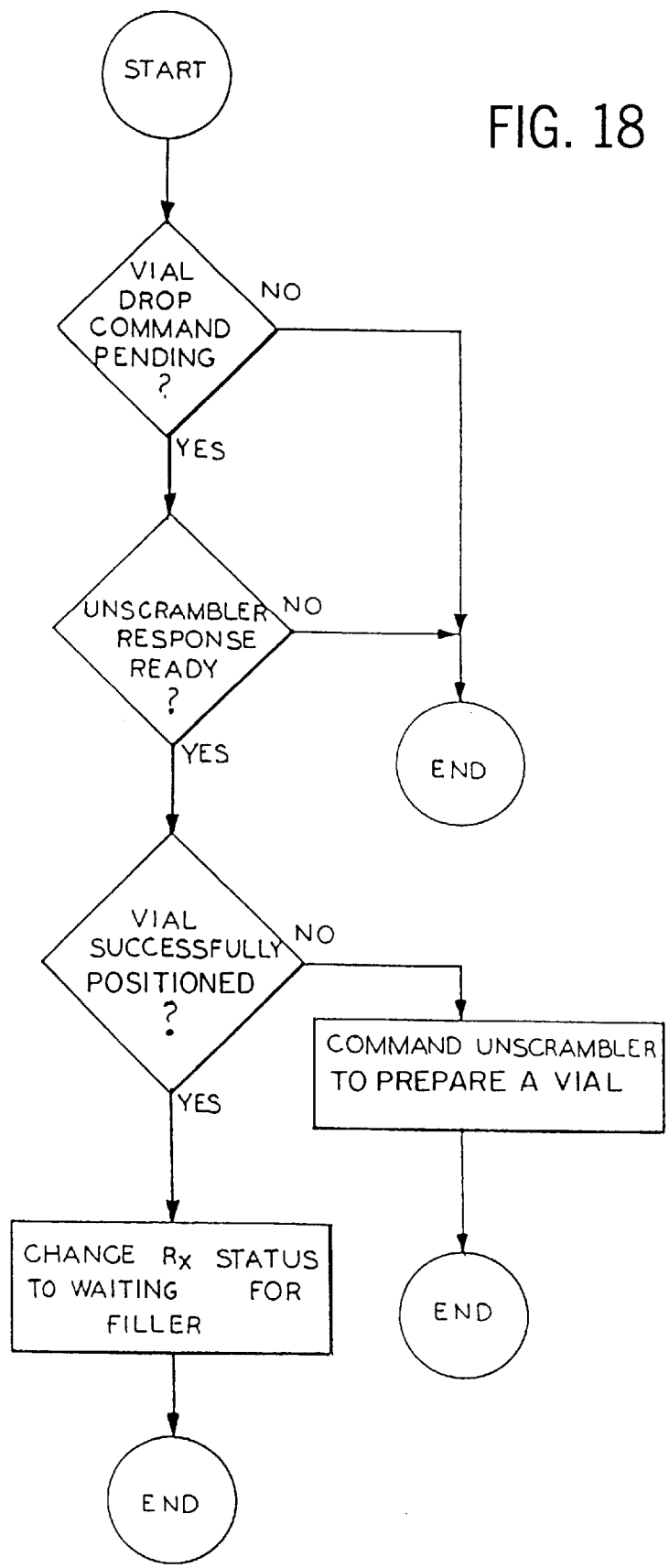
FIG. 18 is a flow diagram for an unscrambler check process in accordance with the principles of the present invention.

Unscrambler Check. As illustrated in FIG. 18, when the unscrambler 110 is checked, a determination is made as to whether a vial preparation command is pending. If no vial preparation command is pending, then the check is discontinued. If a vial preparation command is pending, then a determination is made as to whether the unscrambler 110 is ready to respond. If the unscrambler 110 is not ready to respond, then the check is terminated, If the unscrambler 110 is ready to respond, then a determination is made as to whether a vial has been successfully prepared. If a vial has not been successfully prepared, then a command is issued to the unscrambler 110 to prepare a vial and the unscrambler check is terminated.

Figure 17:
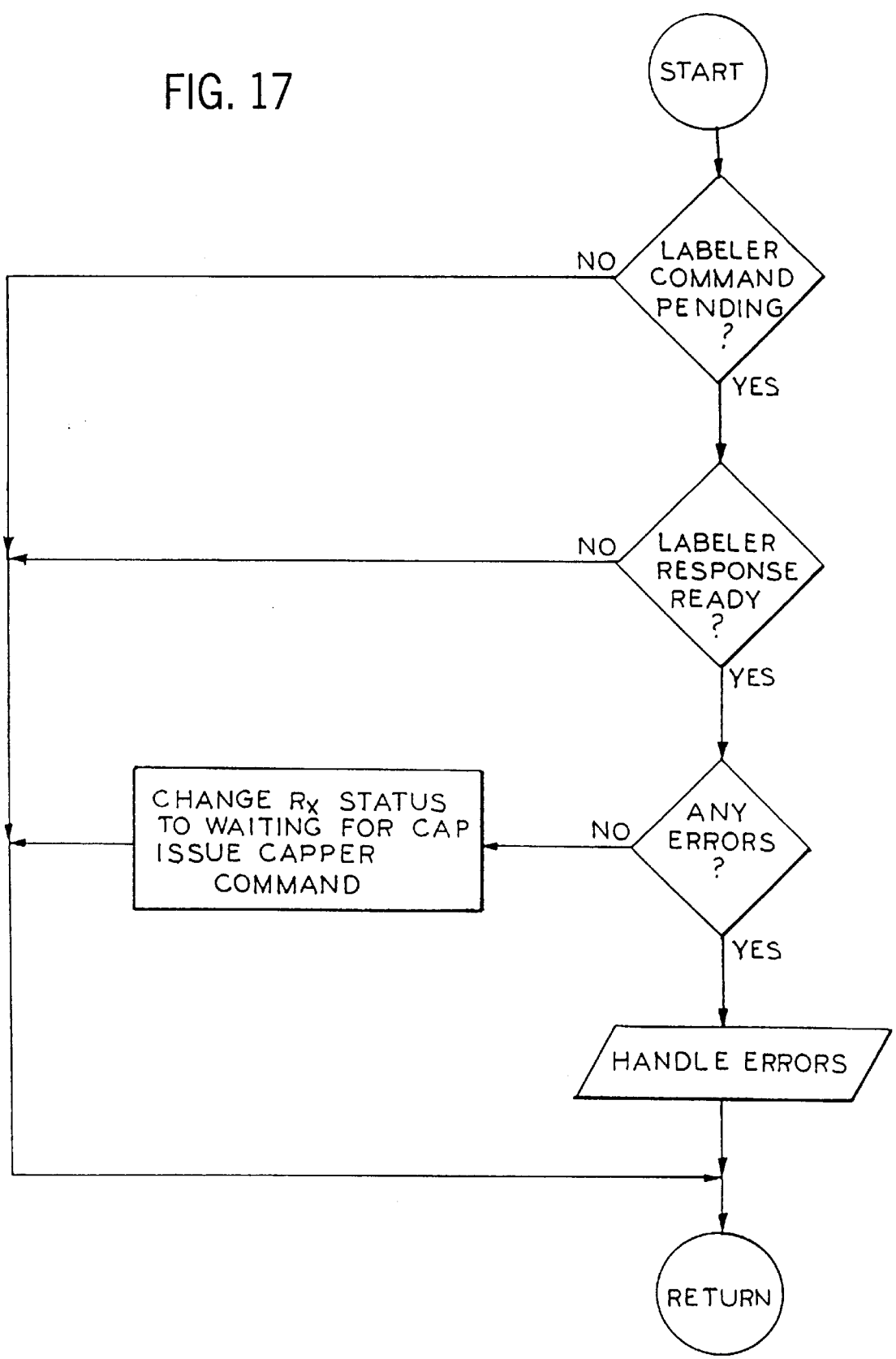
FIG. 17 is a flow diagram for a labeler check process in accordance with the principles of the present invention.

Labeler Check. As illustrated in FIG. 17, when the labeler 170 is checked, a routine is executed that, as a first step, determines whether a labeler command is pending. If no labeler command is pending, then the routine is terminated. If a labeler command is pending, then a determination is made as to whether a labeler response is ready.

If no labeler response is ready, then the routine is terminated. If a labeler response is ready, then a determination is made as to whether any errors have occurred in the unscrambler process. If no errors have occurred, then the prescription is assigned a status of "waiting for filling" and a command is issued to the fill the vial. Then the routine is terminated. If an error in the unscrambler process is detected, then an error handling routine is invoked and the labeler checking routine is terminated.

Figure 15:
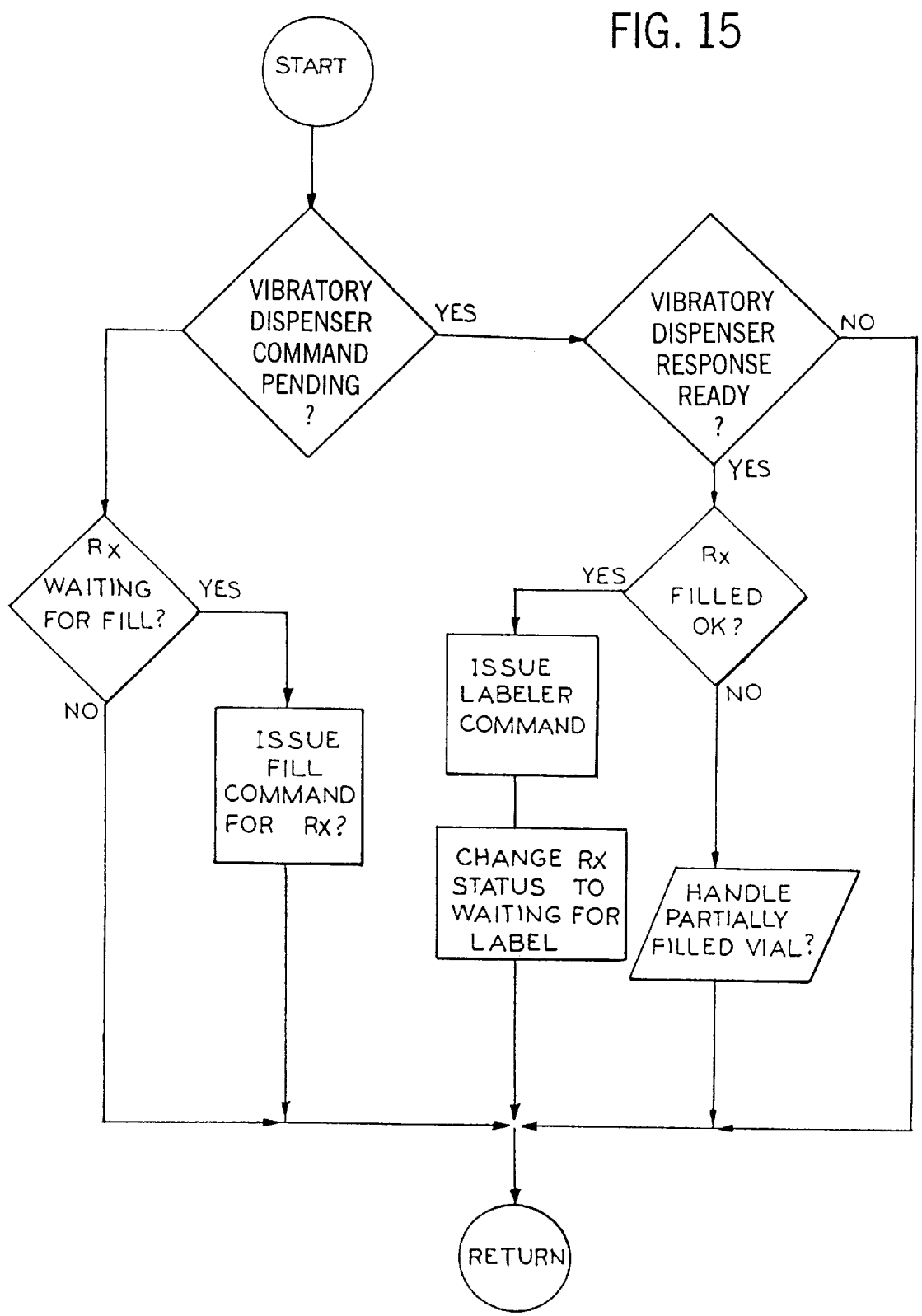
FIG. 15 is a flow diagram for a vibratory dispenser check process in accordance with the principles of the present invention.

Vibratory Dispenser Check. As illustrated in FIG. 15, if a vial has been successfully prepared, then the prescription is assigned a status of "waiting for vibratory dispenser" and a check is then made of the vibratory dispenser 190.

The check of the vibratory dispenser 190 commences with a determination as to whether a vibratory dispenser command is pending. If a vibratory dispenser command is not pending, then a determination is made as to whether a prescription is assigned the status "waiting for filling." If no prescription is assigned the status "waiting for filling," then the check of the filling is terminated. If a prescription is assigned the status "waiting for filling," then a command is issued to the vibratory dispenser to fill the prescription. Then the check of the vibratory dispenser is terminated.

If at the beginning of the check of the vibratory dispenser 190, it is determined that a vibratory dispenser command is pending, then a determination is made as to whether a vibratory dispenser response is ready. If a vibratory dispenser response is not ready, then the check of the vibratory dispenser 190 is terminated. If a vibratory dispenser response is ready, then a determination is made as to whether a prescription has been already filled. If a prescription has not been successfully filled then a signal is issued to alert the system operator or pharmacist of the partially filled vial and the vial is handled appropriately. Then the check of the vibratory dispenser 190 is terminated. If it is determined that a prescription has been successfully filled, then the check of the vibratory dispenser 190 is also terminated.

Figure 19:
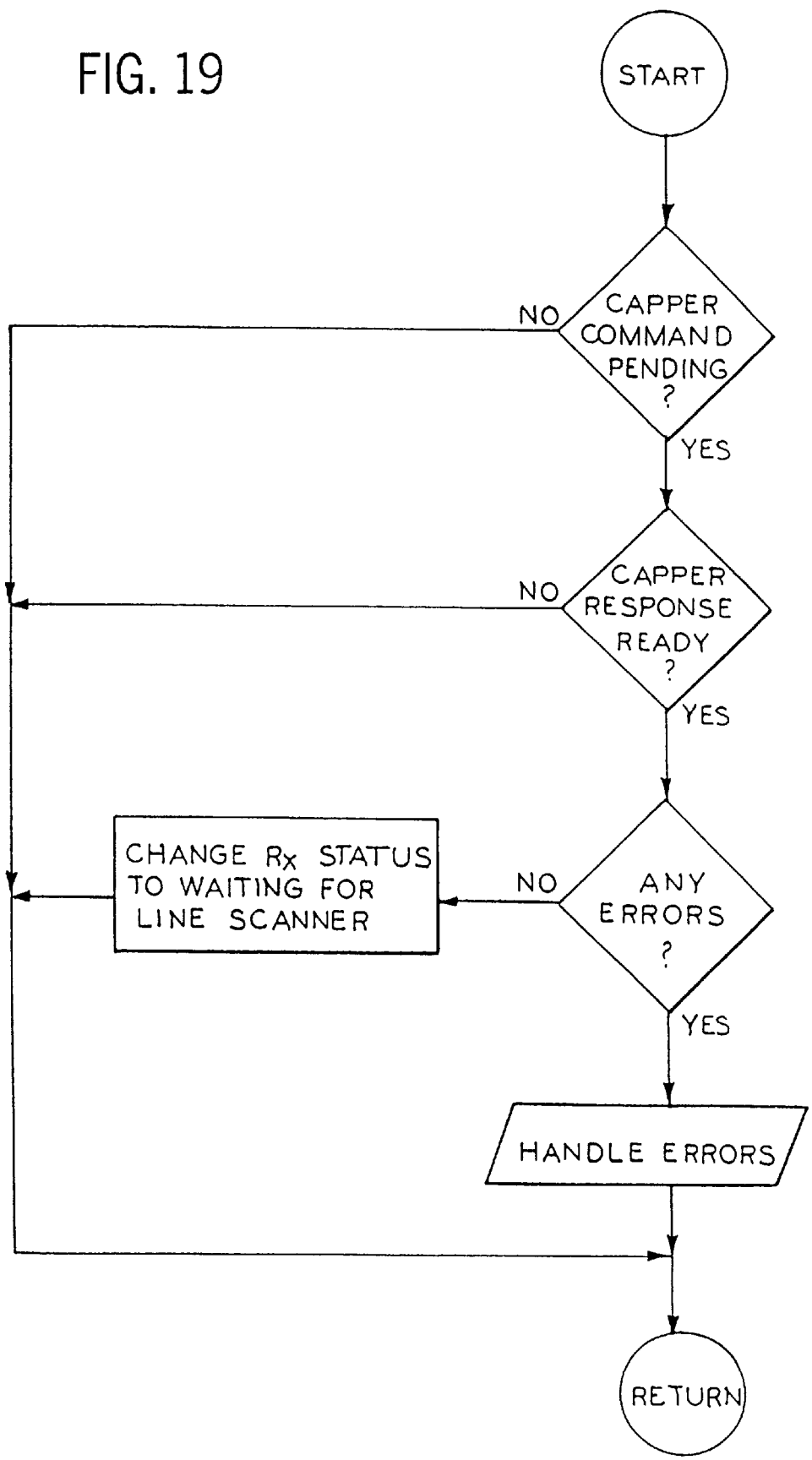
FIG. 19 is a flow diagram for a capper check process in accordance with the principles of the present invention.

Capper Check. As illustrated in FIG. 19, when the capper 155 is checked, a routine is invoked that, as a first step, determines whether a command is pending directing the associated capper 155 to cap a vial, referred to as a capper command.

If no capper command is pending, then the routine is terminated. If a capper command is pending, then a determination is made as to whether a capper response is ready. If a capper response is not ready, then the routine is terminated. If a capper response is ready, then a determination is made as to whether any errors have been detected in the filling process. If no errors have been detected, then the prescription status is assigned a status of "waiting for line scanner." If errors are detected, then the error handling routine is invoked and the capper check routine is terminated.

Figure 20:
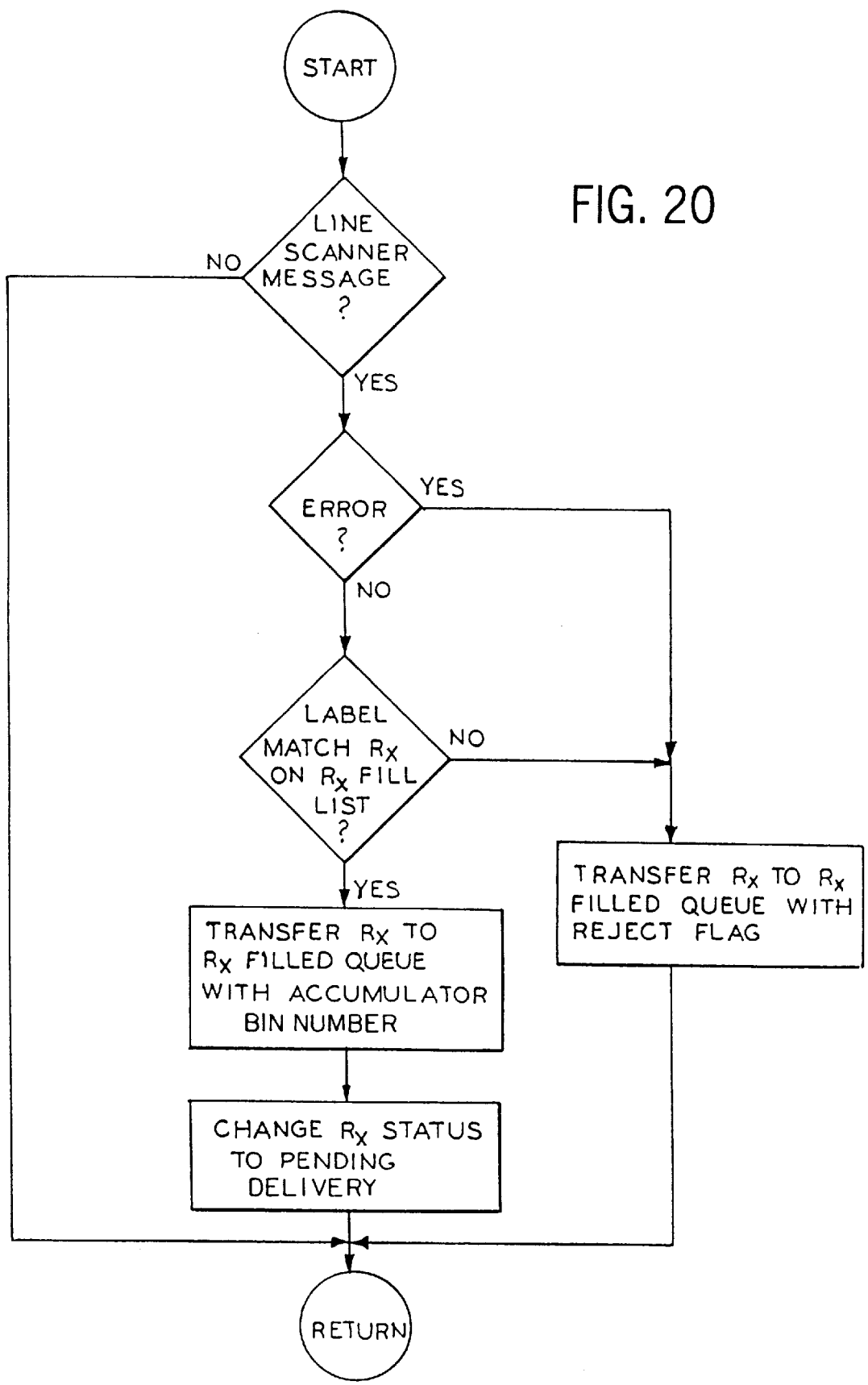
FIG. 20 is a flow diagram for a line scanner check process in accordance with the principles of the present invention.

Line Scanner Check. As illustrated in FIG. 20, when the line scanner 157 is checked, a routine is invoked that determines whether a line scanner message is present. If no line scanner message is present, then the routine is terminated. If a line scanner message is present, then a determination is made as to whether there is a match between the prescription information on the label and the appropriate prescription information in the Prescription Fill List 114. If the label and the Prescription Fill List 114 information match, then the prescription is transferred to the Prescription Filled Queue 118 with an accumulation receptacle 165 number. Subsequently, the prescription is assigned a status of "pending delivery" and the line scanner routine check is terminated. If an error is detected, or if there is no match between the label and the Prescription Fill List 114 information, the prescription is transferred to a Prescription Filled Queue 118 with a reject flag. Then the check line scanner routine is terminated. The line scanner 157 may be checked after a label is applied to a vial and before a drug is dispensed.

Figures 21, 22:
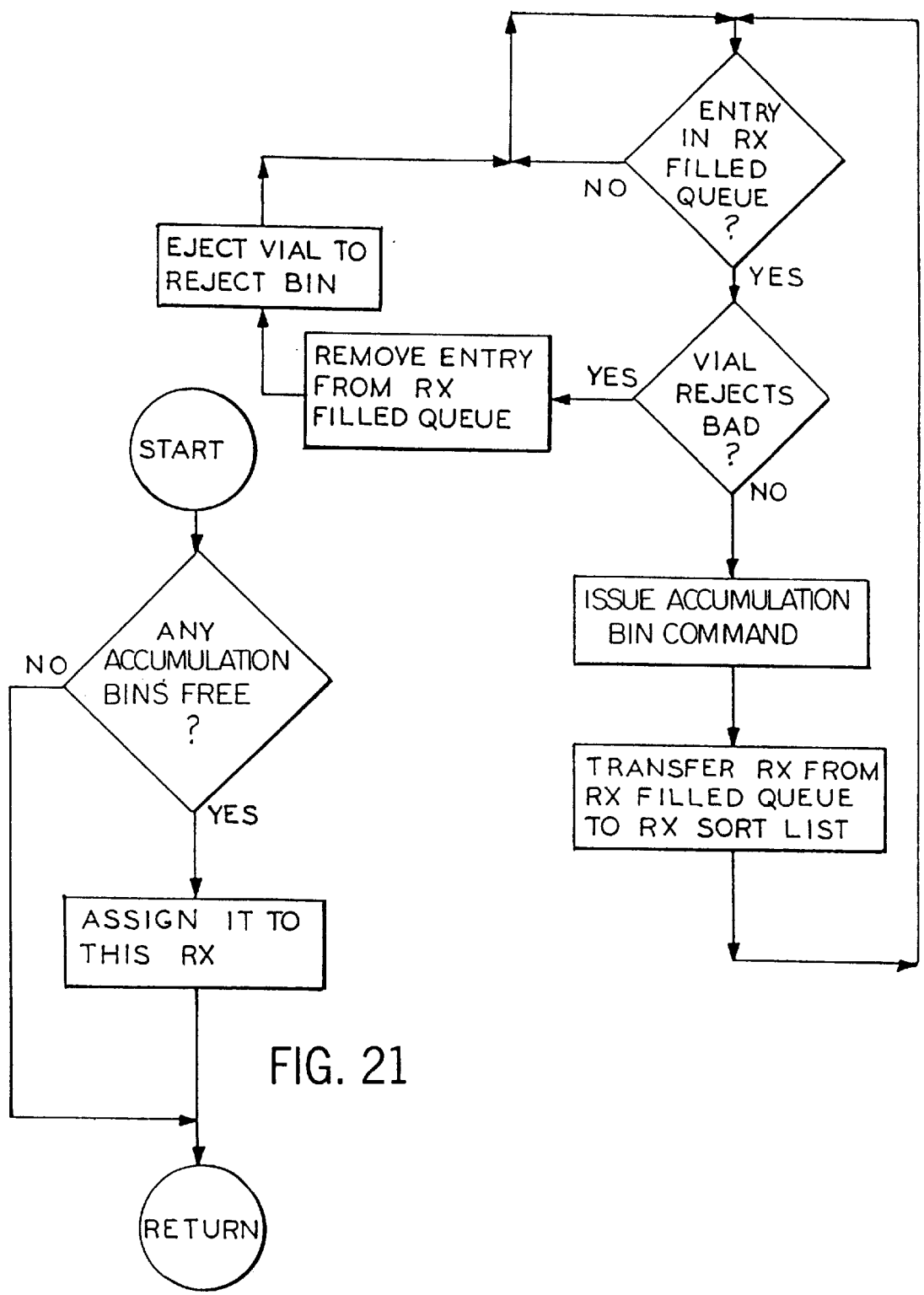
FIG. 21 is a flow diagram for an accumulator check process in accordance with the principles of the present invention.
FIG. 22 is a flow diagram for a staging input process in accordance with the principles of the present invention.

Accumulation Receptacle Check. As illustrated in FIG. 21, the accumulator area 163 is checked to determine whether a free accumulation receptacle 165 exists. If an accumulation receptacle is free, it is assigned. If no accumulation receptacles are free, then the routine is terminated.

Staging Input Process. As illustrated in FIG. 22, the Staging Input Process 210 removes prescriptions from the Prescription Filled Queue 118 in a FIFO order. This process also determines if the prescription flagged is "good," i.e., not rejected. If the prescription is flagged as good, then the prescription is placed into an assigned accumulation bin by the robotic assembly. The prescription is then removed from the Prescription Filled Queue 118 and placed at the tail end of the Prescription Sort List 111.

If the prescription is flagged as bad, a command removes the prescription order from the Prescription Filled Queue 118. The vial is ejected into the reject bin by a blast of air prior to reaching the accumulator area 163 and any assigned accumulation receptacle 165 is freed up. Alternately, as described above, a vial may be held up until an operator chooses to dispense less than the prescribed quantity of drug or to reject the vial.

To accomplish the foregoing, as a first step, this process determines whether there is an entry in the Prescription Filled Queue 118. If no entry is made, then this routine loops until an entry is made in the Prescription Filled Queue 118. Subsequently, the prescription information is transferred from the Prescription Filled Queue 118 to the Prescription Sort List 111 and the staging input process routine recommences.

Figure 23:
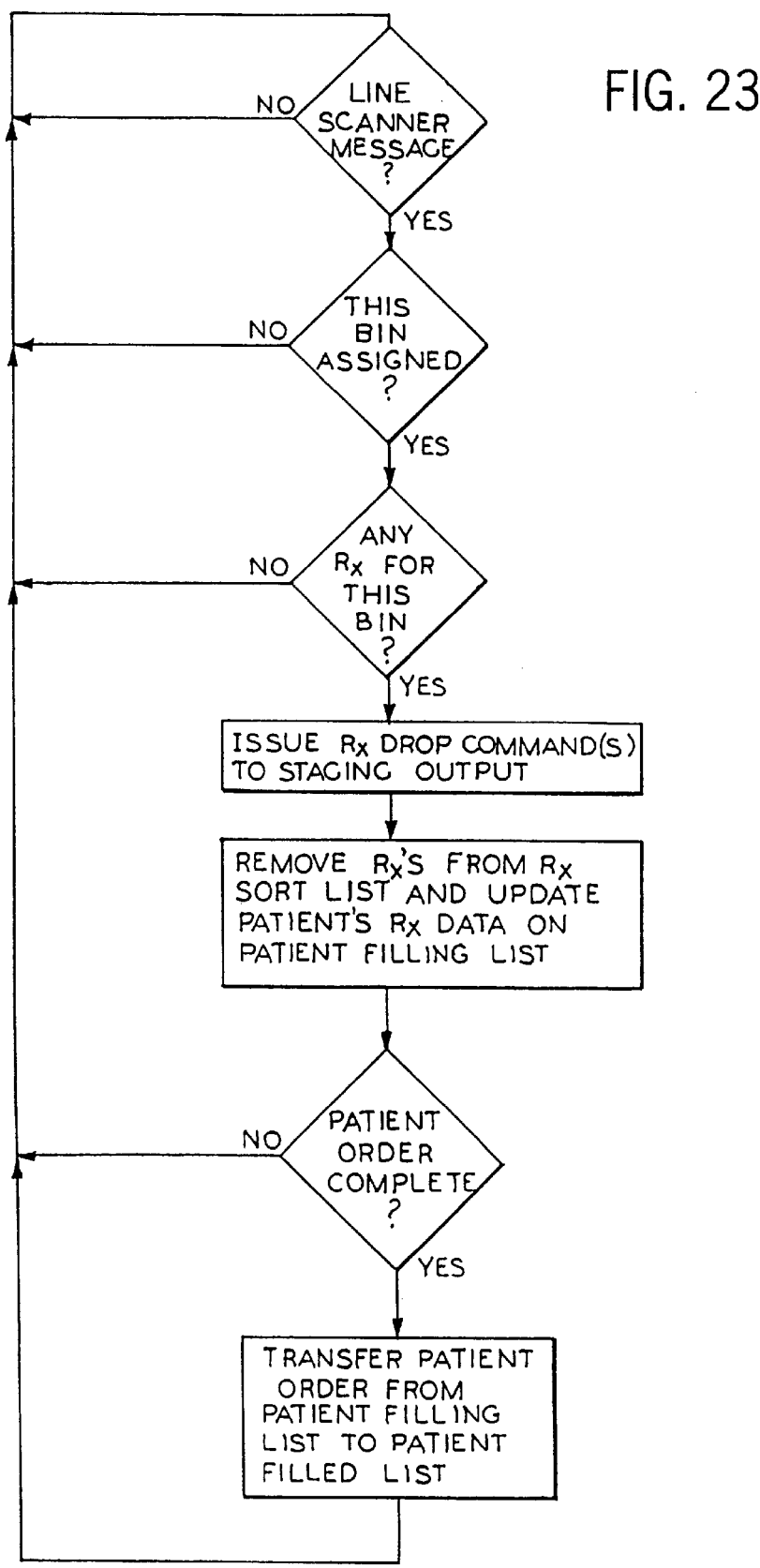
FIG. 23 is a flow diagram for a prescription sort process in accordance with the principles of the present invention.

Prescription Sort Process. As illustrated in FIG. 23, in the Prescription Sort Process 212, prescriptions are matched with the accumulation receptacles 165. As described above, accumulation receptacles may be moveable or stationary. An accumulation receptacle 165 is checked for assignment to a patient. If it is assigned to a patient, the patient's information is found in the Patient Filling List 106. This list entry is then used to check if any of the prescriptions in the Prescription Sort List 111 (i.e., those vials or unit-of-use drugs) need to be dropped into this accumulation receptacle. If a prescription needs to be dropped into this accumulation receptacle, it is removed from the Prescription Sort List 111 and placed at the tail end of the associated Prescription Sorted List 120. The patient order is then checked for completion (i.e., all prescriptions dropped into the patient's accumulation receptacle). If the patient's order is complete the patient's order is removed from the Patient Filling List 106 and placed at the tail end of the Patient Filled List 122.

In a routine for this process, as a first step, a determination is made as to whether a line scanner message exists. If no message exists, then the routine loops back to the beginning. If a line scanner message exists, then a determination is made as to whether an accumulation receptacle is assigned. If an accumulation receptacle 165 is not assigned, then the routine recommences. If an accumulation receptacle 165 is assigned to a patient, then a determination is made as to whether any prescriptions are to be placed in the assigned accumulation receptacle 165. If no prescriptions are to be placed in this accumulation receptacle 165, then the prescription routine recommences. If prescriptions are to be placed in the accumulation receptacle 165, then a command is issued to start the Staging Output Process 214. Subsequently, the prescription is removed from the Prescription Sort List 111 and the patient's prescription status is updated on the Patient Filling List 106. Then a determination is made as to whether a patient's order is complete. If a patient's order is not complete, the routine is recommenced. If the patient's order is complete, then the patient's order is transferred from the Patient Filling List 106 to a Patient Filled List 122.

It should be understood that various changes and modifications to the presently preferred embodiments described herein will be apparent to those skilled in the art. Such changes and modifications can be made without departing from the spirit and scope of the present invention and without diminishing the attendant advantages of the invention. It is therefore intended that such changes and modifications be covered by the appended claims.

What is claimed is:

1. Apparatus for automatically filling prescription orders for oral solid medication in accordance with patient-specific prescription information comprising:

a controller for receiving the patient-specific prescription information and for controlling prescription filling apparatus for filling the prescription order;

a plurality of oral solid medication containers for containing oral solid medication therein;

at least one vibratory dispenser operatively controlled by the controller and including a coupling for attachment of an oral solid medication container in a detachable relationship, the dispenser providing vibration to a coupled container in response to the prescription information so that medication is dispensed from the container into a vial;

at least one container transport assembly operatively controlled by the controller for automatic transport of an oral solid medication container between a container storage location and the vibratory dispenser in response to the prescription information; and a vial transport assembly operatively controlled by the controller for automatic transport of empty vials to the vibratory dispenser and filled vials to at least one predetermined location in response to the prescription information;

whereby the filled prescription order is collected in the at least one predetermined location.

2. The prescription filling apparatus of claim 1 wherein the predetermined location is an accumulator and the filled vials according to a patient-specific prescription order are transported to the accumulator for collection.

3. The prescription filling apparatus of claim 1 further including a vial labeler positioned with respect to a vial for applying a label to the vial.

4. The prescription filling apparatus of claim 3 further including a vial capper positioned with respect to a filled vial for capping the vial.

5. The prescription filling apparatus of claim 1 wherein the oral solid medication containers are canisters comprising:

a canister body having a bottom wall, at least one sidewall and inner and outer canister surfaces, at least one wall defining a discharge opening through which the oral solid medication is discharged from the canister and the at least one sidewall defining an opening through which medication is loaded into the canister;

medication separation structure positioned with respect to the canister inner surface, the separation structure having a first end for receiving oral solid medication from the canister, a second end in communication with the discharge opening and a separation surface therebetween on which the medication is transported along the surface to the discharge opening; and a coupling mechanism attached to the canister for detachably coupling the canister to the vibratory dispenser.

6. The prescription filling apparatus of claim 5, wherein the separation surface is of a predetermined width so as to cause the medication to be arranged in a substantially single row.

7. The prescription filling apparatus of claim 5 further including:

a frame positioned with respect to the container transport assembly; and a plurality of canister storage shelves along the frame, each shelf for storing at least one canister.

8. The prescription filling apparatus of claim 1 wherein the at least one oral solid medication container is a canister and the coupling is a quick coupling mechanism attaching the canister to the vibratory dispenser and permitting rapid coupling and decoupling of the canister from the dispenser.

9. The prescription filling apparatus of claim 8, wherein the quick coupling mechanism comprises:

a magnet attached to the vibratory dispenser; and a magnetically-attractive member attached to the canister; whereby, the canister is detachably coupled to the vibratory dispenser by the action of the magnet and the magnetically-attractive member.

10. The prescription filling apparatus of claim 1 wherein the vibratory dispenser includes:

at least one drive unit for vibrating an oral solid medication container mounted thereon, a coupling mechanism attached to the vibratory dispenser for detachably coupling the oral solid medication container to the drive unit; and a sensor positioned in an oral solid medication dispensing path, the sensor registering a count when the dispensed oral solid medication passes the sensor.

11. The prescription filling apparatus of claim 10, wherein the coupling mechanism is a magnet secured with respect to the drive unit designed for mating with a magnetically-attractive member positioned on the oral solid medication container.

12. The prescription filling apparatus of claim 10 wherein the vibratory dispenser vibrates the oral solid medication container by varying an amplitude component of the vibration.

13. The prescription filling apparatus of claim 10 wherein the vibratory dispenser vibrates the oral solid medication container by varying a frequency component of the vibration.

14. The prescription filling apparatus of claim 10 further including:

a comparator for comparing the amount of dispensed medication to the amount of medication to be dispensed including a comparison at a vial filling cycle end period; and if the comparison at the vial filling cycle end period shows that less than all of the medication has been dispensed, the controller causes the vibratory dispenser to provide at least one vibratory pulse to dispense any remaining medication from the oral solid medication container.

15. The prescription filling apparatus of claim 10 wherein the container transport assembly comprises:

a drive mechanism for positioning the assembly to grip an oral solid medication container; and a gripper assembly coupled to the drive mechanism for gripping an oral solid medication container.

16. The prescription filling apparatus of claim 15 wherein the drive mechanism comprises:

a plurality of guides arranged in an orthogonal coordinate system; and a motor for moving the assembly along the guides.

17. The prescription filling apparatus of claim 16 wherein the gripper assembly comprises:

at least two generally opposed fingers moveable between an open, release position and a closed, gripping position;

a rotatable cam operatively connected to the fingers for opening and closing the fingers; and at least one limit switch for sensing whether the fingers are in the opened or closed positions.

18. The prescription filling apparatus of claim 17 further including a motor for rotating the cam.

19. The prescription filling apparatus of claim 1 wherein the vial transport assembly is the container transport assembly.

* * * * *

UNITED STATES PATENT AND TRADEMARK OFFICE
CERTIFICATE OF CORRECTION

PATENT NO.    : 6,449,927 B2  
DATED         : September 17, 2002  
INVENTOR(S)   : Terrance J. Hebron et al.

It is certified that error appears in the above-identified patent and that said Letters Patent is hereby corrected as shown below:

Column 5,  
Line 59, delete "laced" and insert -- placed --;

Column 14,  
Line 16, after "terminated", delete "," and insert -- . --.

Signed and Sealed this

Twenty-ninth Day of April, 2003

JAMES E. ROGAN  
*Director of the United States Patent and Trademark Office*